(12) United States Patent
Vendrow

(10) Patent No.: US 8,885,809 B2
(45) Date of Patent: *Nov. 11, 2014

(54) TECHNIQUES FOR BYPASSING CALL SCREENING IN A CALL MESSAGING SYSTEM

(71) Applicant: RingCentral, Inc., San Mateo, CA (US)

(72) Inventor: Vlad Vendrow, Redwood Shores, CA (US)

(73) Assignee: RingCentral, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/158,959

(22) Filed: Jan. 20, 2014

(65) Prior Publication Data

US 2014/0133644 A1 May 15, 2014

Related U.S. Application Data

(63) Continuation of application No. 13/615,335, filed on Sep. 13, 2012, which is a continuation of application No. 12/237,213, filed on Sep. 24, 2008, now Pat. No. 8,275,110.

(60) Provisional application No. 60/995,965, filed on Sep. 28, 2007.

(51) Int. Cl.
*H04M 3/42* (2006.01)
*H04M 7/00* (2006.01)
*H04W 40/00* (2009.01)
*H04L 12/66* (2006.01)
*H04M 3/436* (2006.01)

(52) U.S. Cl.
CPC ...... *H04M 3/436* (2013.01); *H04M 2203/2011* (2013.01)
USPC ............ 379/211.02; 379/201.01; 379/207.15; 379/211.01; 379/221.01; 370/352; 455/455

(58) Field of Classification Search
USPC .............. 379/207.01, 142.01, 93.17, 211.02, 379/67.1, 201.01, 201.02, 211.01, 207.15, 379/221.01, 220.01, 219; 455/445; 370/352
See application file for complete search history.

(56) References Cited

U.S. PATENT DOCUMENTS 5,195,131 A 3/1993 Sano
5,530,740 A 6/1996 Irribarren et al.
(Continued)

FOREIGN PATENT DOCUMENTS

EP 0954193 A2 11/1999
JP 1054889 A 3/1989
(Continued)

OTHER PUBLICATIONS

Copenheaver, B.; Notification of the Transmittal of the International Search report and Written Opinion of the International Searching Authority, or the Declaration; International Application No. PCT/US2008/077546; Date of Mailing Dec. 8, 2008; Form PCT/ISA/220 (1 page); Form PCT/ISA/210 (2 pages); Form PCT/ISA/237 (5 pages).

(Continued)

*Primary Examiner* — Thjuan K Addy
(74) *Attorney, Agent, or Firm* — Hickman Palermo Truong Becker Bingham Wong LLP; Adam C. Stone

(57) ABSTRACT

Techniques for bypassing call screening in a call messaging system. In one embodiment, for example, a method performed by one or more computing devices comprises: receiving an incoming call from a device of a caller; determining whether a bypass condition exists for the incoming call; and in response to determining that the bypass condition exists, causing the incoming call to be connected to a device of a callee without performing a call screening action of a call screening rule that, based at least in part on one or more conditions of the call screening rule, applies to the incoming call.

19 Claims, 13 Drawing Sheets

(56) References Cited

U.S. PATENT DOCUMENTS

| | | |
|---|---|---|
| 5,712,712 A | 1/1998 | Sayward |
| 5,717,742 A | 2/1998 | Hyde-Thomson |
| 5,799,065 A | 8/1998 | Junqua et al. |
| 5,889,845 A | 3/1999 | Staples et al. |
| 5,896,448 A | 4/1999 | Holt |
| 5,987,535 A | 11/1999 | Knodt et al. |
| 6,038,451 A | 3/2000 | Syed et al. |
| 6,041,110 A | 3/2000 | Lautenschlager et al. |
| 6,104,790 A | 8/2000 | Narayanaswami |
| 6,230,024 B1 | 5/2001 | Wang et al. |
| 6,377,950 B1 | 4/2002 | Peters et al. |
| 6,442,404 B1 | 8/2002 | Sakajiri |
| 6,542,475 B1 | 4/2003 | Bala et al. |
| 6,584,093 B1 | 6/2003 | Salama et al. |
| 6,587,555 B1 | 7/2003 | Cripe et al. |
| 6,760,324 B1 | 7/2004 | Scott et al. |
| 6,792,085 B1 | 9/2004 | Rigaldies et al. |
| 6,801,341 B1 | 10/2004 | Joffe et al. |
| 6,801,520 B2 | 10/2004 | Philonenko |
| 6,816,483 B1 | 11/2004 | Beckstrom et al. |
| 6,870,910 B1 | 3/2005 | Armstrong et al. |
| 6,879,676 B1 | 4/2005 | Contractor |
| 6,901,139 B2 | 5/2005 | Gonzalez et al. |
| 6,950,507 B1 | 9/2005 | Kaplan |
| 6,967,947 B1 | 11/2005 | Chen et al. |
| 6,987,840 B1 | 1/2006 | Bosik et al. |
| 6,993,360 B2 | 1/2006 | Plahte et al. |
| 6,993,561 B2 | 1/2006 | Lincke et al. |
| 6,999,469 B1 | 2/2006 | Chu et al. |
| 7,003,087 B2 | 2/2006 | Spencer et al. |
| 7,006,614 B2 | 2/2006 | Feinberg et al. |
| 7,024,457 B1 | 4/2006 | Newman et al. |
| 7,024,474 B2 | 4/2006 | Clubb et al. |
| 7,031,437 B1 | 4/2006 | Parsons et al. |
| 7,047,525 B2 | 5/2006 | Prunty et al. |
| 7,076,558 B1 | 7/2006 | Dunn |
| 7,110,523 B2 | 9/2006 | Gagle et al. |
| 7,123,608 B1 | 10/2006 | Scott et al. |
| 7,162,020 B1 | 1/2007 | Forte |
| 7,180,638 B1 | 2/2007 | Hou et al. |
| 7,180,991 B2 | 2/2007 | Dhara et al. |
| 7,184,527 B1 | 2/2007 | Lin et al. |
| 7,245,913 B1 | 7/2007 | Nguyen et al. |
| 7,254,643 B1 | 8/2007 | Peters et al. |
| 7,274,684 B2 | 9/2007 | Young et al. |
| 7,298,833 B2 | 11/2007 | Klein et al. |
| 7,308,255 B2 | 12/2007 | Loveland |
| 7,324,635 B2 | 1/2008 | Wood et al. |
| 7,333,820 B2 | 2/2008 | Sheha et al. |
| 7,359,368 B2 | 4/2008 | Pearce |
| 7,369,648 B1 | 5/2008 | Chang |
| 7,426,218 B1 | 9/2008 | Archer et al. |
| 7,640,293 B2 | 12/2009 | Wilson et al. |
| 7,702,669 B2 | 4/2010 | Vendrow et al. |
| 7,734,294 B2 | 6/2010 | Kent et al. |
| 7,822,186 B1 | 10/2010 | Boni |
| 7,996,036 B1 | 8/2011 | Chen et al. |
| 8,000,454 B1 | 8/2011 | Or-Bach et al. |
| 8,020,486 B2 | 9/2011 | Yamamoto et al. |
| 2002/0064149 A1 | 5/2002 | Elliott et al. |
| 2002/0067714 A1 | 6/2002 | Crain et al. |
| 2002/0080025 A1 | 6/2002 | Beattie |
| 2002/0085701 A1 | 7/2002 | Parsons et al. |
| 2002/0120697 A1 | 8/2002 | Generous et al. |
| 2002/0122547 A1 | 9/2002 | Hinchey et al. |
| 2003/0007625 A1 | 1/2003 | Pines et al. |
| 2003/0008612 A1 | 1/2003 | Andreason |
| 2003/0017860 A1 | 1/2003 | Choi |
| 2003/0095541 A1 | 5/2003 | Chang et al. |
| 2003/0186686 A1 | 10/2003 | Yang et al. |
| 2004/0005042 A1 | 1/2004 | Dhara et al. |
| 2004/0028208 A1 | 2/2004 | Carnazza et al. |
| 2004/0111305 A1 | 6/2004 | Gavan et al. |
| 2004/0120479 A1 | 6/2004 | Creamer et al. |
| 2004/0121814 A1 | 6/2004 | Creamer et al. |
| 2004/0160951 A1 | 8/2004 | Galvin et al. |
| 2004/0202300 A1 | 10/2004 | Cooper et al. |
| 2004/0203918 A1 | 10/2004 | Moriguchi et al. |
| 2004/0204038 A1 | 10/2004 | Suzuki et al. |
| 2004/0218748 A1 | 11/2004 | Fisher |
| 2004/0229620 A1 | 11/2004 | Zhao et al. |
| 2005/0047373 A1 | 3/2005 | Kojima |
| 2005/0047579 A1 | 3/2005 | Salame |
| 2005/0083915 A1 | 4/2005 | Mathew et al. |
| 2005/0088686 A1 | 4/2005 | Tanimoto |
| 2005/0117733 A1 | 6/2005 | Widger et al. |
| 2005/0141479 A1 | 6/2005 | Ozugur et al. |
| 2005/0153739 A1 | 7/2005 | Halsell |
| 2005/0180551 A1 | 8/2005 | Meek et al. |
| 2005/0191969 A1* | 9/2005 | Mousseau ............... 455/90.2 |
| 2005/0195802 A1 | 9/2005 | Klein et al. |
| 2005/0207556 A1 | 9/2005 | Gonzalez et al. |
| 2006/0008066 A1 | 1/2006 | Starling et al. |
| 2006/0018454 A1 | 1/2006 | Nonaka et al. |
| 2006/0023657 A1 | 2/2006 | Woodson et al. |
| 2006/0030357 A1 | 2/2006 | McConnell et al. |
| 2006/0085516 A1 | 4/2006 | Farr et al. |
| 2006/0099931 A1 | 5/2006 | Trujillo |
| 2006/0116127 A1 | 6/2006 | Wilhoite et al. |
| 2006/0126806 A1 | 6/2006 | Trandal et al. |
| 2006/0135202 A1 | 6/2006 | Ho et al. |
| 2006/0160566 A1 | 7/2006 | Plahte et al. |
| 2006/0161435 A1 | 7/2006 | Atef et al. |
| 2006/0205436 A1 | 9/2006 | Liu et al. |
| 2006/0210050 A1 | 9/2006 | Bartfeld et al. |
| 2006/0215543 A1 | 9/2006 | Croak et al. |
| 2006/0253895 A1 | 11/2006 | Brandofino et al. |
| 2007/0047534 A1 | 3/2007 | Hakusui |
| 2007/0058637 A1 | 3/2007 | Lo |
| 2007/0060137 A1 | 3/2007 | Yeatts et al. |
| 2007/0070976 A1 | 3/2007 | Mussman et al. |
| 2007/0105531 A1 | 5/2007 | Schroeder, Jr. |
| 2007/0111716 A1 | 5/2007 | Leigh et al. |
| 2007/0115498 A1 | 5/2007 | Noel et al. |
| 2007/0115978 A1 | 5/2007 | Kondo |
| 2007/0173237 A1 | 7/2007 | Roundtree |
| 2007/0198677 A1 | 8/2007 | Ozhan et al. |
| 2007/0253545 A1 | 11/2007 | Chatterjee et al. |
| 2007/0266077 A1 | 11/2007 | Wengrovitz |
| 2008/0002820 A1 | 1/2008 | Shtiegman et al. |
| 2008/0032704 A1 | 2/2008 | O'Neil et al. |
| 2008/0032716 A1 | 2/2008 | Forte |
| 2008/0037763 A1 | 2/2008 | Shaffer |
| 2008/0043976 A1 | 2/2008 | Maximo et al. |
| 2008/0056234 A1 | 3/2008 | Sprague |
| 2008/0075261 A1 | 3/2008 | Ramanathan et al. |
| 2008/0144804 A1 | 6/2008 | Mergen |
| 2008/0186929 A1 | 8/2008 | Rice et al. |
| 2008/0240376 A1 | 10/2008 | Conway et al. |
| 2008/0279362 A1 | 11/2008 | Yasrebi et al. |
| 2008/0298567 A1 | 12/2008 | Guile |
| 2009/0015876 A1 | 1/2009 | Brown |
| 2009/0029724 A1 | 1/2009 | Hardy et al. |
| 2009/0054032 A1 | 2/2009 | Ren et al. |
| 2009/0059818 A1 | 3/2009 | Pickett |
| 2009/0080029 A1 | 3/2009 | Vendrow et al. |
| 2009/0086947 A1 | 4/2009 | Vendrow |
| 2009/0097632 A1 | 4/2009 | Carnazza et al. |
| 2009/0116466 A1 | 5/2009 | Lee et al. |
| 2009/0154666 A1 | 6/2009 | Rios et al. |
| 2009/0154678 A1 | 6/2009 | Kewin et al. |
| 2009/0202050 A1 | 8/2009 | Berger et al. |
| 2009/0296907 A1 | 12/2009 | Vendrow et al. |
| 2009/0310598 A1 | 12/2009 | Winbladh et al. |
| 2010/0002626 A1 | 1/2010 | Schmidt et al. |
| 2010/0029272 A1 | 2/2010 | Mccann et al. |
| 2010/0035594 A1 | 2/2010 | Vendrow et al. |
| 2010/0039676 A1 | 2/2010 | Noel et al. |
| 2010/0039677 A1 | 2/2010 | Noel et al. |
| 2010/0039678 A1 | 2/2010 | Noel et al. |
| 2010/0039679 A1 | 2/2010 | Noel et al. |
| 2010/0046037 A1 | 2/2010 | Noel et al. |
| 2010/0046731 A1 | 2/2010 | Gisby et al. |
| 2010/0080214 A1 | 4/2010 | Li et al. |

(56) References Cited

U.S. PATENT DOCUMENTS

| | | |
|---|---|---|
| 2010/0081380 A1 | 4/2010 | Lim et al. |
| 2010/0099390 A1 | 4/2010 | Vendrow et al. |
| 2010/0113013 A1 | 5/2010 | Karabinis et al. |
| 2010/0128291 A1 | 5/2010 | Vendrow et al. |
| 2010/0128861 A1 | 5/2010 | Vendrow et al. |
| 2010/0128862 A1 | 5/2010 | Vendrow |
| 2010/0128867 A1 | 5/2010 | Vendrow et al. |
| 2010/0130172 A1 | 5/2010 | Vendrow et al. |
| 2010/0130213 A1 | 5/2010 | Vendrow et al. |
| 2010/0130228 A1 | 5/2010 | Vendrow et al. |
| 2010/0183134 A1 | 7/2010 | Vendrow et al. |
| 2010/0184408 A1 | 7/2010 | Vendrow et al. |
| 2010/0185584 A1 | 7/2010 | Vendrow et al. |
| 2011/0053643 A1 | 3/2011 | Shmunis |
| 2011/0115011 A1 | 5/2011 | Masuoka et al. |
| 2011/0130168 A1 | 6/2011 | Vendrow et al. |
| 2011/0153668 A1 | 6/2011 | Walker et al. |
| 2011/0177797 A1 | 7/2011 | Vendrow et al. |
| 2011/0191441 A1 | 8/2011 | Herriman et al. |
| 2011/0293083 A1 | 12/2011 | Larson et al. |

FOREIGN PATENT DOCUMENTS

| | | |
|---|---|---|
| JP | 2002-314642 | 10/2002 |
| JP | 2007-006288 | 1/2007 |
| KR | 1020000023675 A | 4/2000 |
| KR | 1020010011139 A | 2/2001 |
| KR | 1020020086695 A | 11/2002 |
| KR | 1020040039569 A | 5/2004 |
| KR | 1020050014088 A | 2/2005 |
| KR | 1020050000884 A | 6/2005 |
| KR | 1020050061255 A | 6/2005 |
| KR | 1020050116096 A | 12/2005 |
| KR | 1020060018155 A | 2/2006 |
| KR | 1020060096568 A | 9/2006 |
| KR | 1020060115833 A | 11/2006 |
| KR | 1020070006314 A | 1/2007 |
| KR | 100815239 B1 | 3/2008 |
| KR | 1020080029682 A | 4/2008 |
| KR | 1020090058808 A | 6/2009 |
| KR | 1020100065221 A | 6/2010 |
| WO | WO 9511578 A1 | 4/1995 |
| WO | WO 9823080 A2 | 5/1998 |
| WO | WO 9827754 A2 | 6/1998 |
| WO | WO 9834391 A2 | 8/1998 |
| WO | WO 9847298 A2 | 10/1998 |
| WO | WO 2006022421 A1 | 3/2006 |
| WO | WO 2006056983 A2 | 6/2006 |
| WO | WO 2007025950 A1 | 3/2007 |
| WO | WO 2007053420 A2 | 5/2007 |
| WO | WO 2008074122 A1 | 6/2008 |
| WO | WO 2010059756 A2 | 5/2010 |
| WO | WO 2010/062981 A2 | 6/2010 |

OTHER PUBLICATIONS

Copenheaver, B., Notification of the Transmittal of the International Search report and Written Opinion of the International Searching Authority, or the Declaration; International Application No. PCT/US2008/077683; Date of Mailing Dec. 10, 2008; Form PCT/ISA/220 (1 page); Form PCT/ISA/210 (2 pages); Form PCT/ISA/237 (6 pages).
Commissioner; Notification of Transmittal of the International Search Report and the Written Opinion of the International Searching Authority, or the Declaration; International Application No. PCT/US2009/065969; Date of Mailing May 28, 2010; Form PCT/ISA/220 (4 pages); Form PCT/ISA/210 (3 pages); Form PCT/ISA/237 (4 pages).
Baharlou, S.; Notification Concerning Transmittal of International Preliminary Report on Patentability (Chapter 1 of the Patent Cooperation Treaty); International Application No. PCT/US2009/065969; Date of Mailing Jun. 9, 2011; Form PCT/IB/326 (1 page); Form PCT/IB/373 (1 page); Form PCT/ISA/237 (4 pages).
Nickitas-Etienne, A.; Notification Concerning Transmittal of International Preliminary Report on Patentability (Chapter 1 of the Patent Cooperation Treaty); International Application No. PCT/US2009/065036; Date of Mailing Jun. 3, 2011; Form PCT/IB/326 (1 page); Form PCT/IB/373 (1 page); Form PCT/ISA/237 (5 pages).
Commissioner; Notification of Transmittal of the International Search Report and the Written Opinion of the International Searching Authority, or the Declaration; International Application No. PCT/US2009/065036; Date of Mailing Jul. 9, 2010; Form PCT/ISA/220 (2 pages); Form PCT/ISA/210 (3 pages); Form PCT/ISA/237 (5 pages).
"Call Routing Rules," IBM Lotis Sametine Unified Telephony Administrator's Guide, IBM Corp., 2009, p. 177; see also, Call Routing Rules < http://publib.boulder.ibm.com/infocenter/sametime/v8r0/index.jsp?topic=/com.ibm.help.sametime.telephony.doc/sut_adm_monitor_rules_c.html >.
Kunwadee, S. et al., "Call Routing Management in Enterprise VoIP Networks," INM '07, Aug. 27-31, 2001, ACM SIGCOMM Workshop, pp. 1-6, Kyoto, Japan.
Copenheaver, B., Notification of Transmittal of the International Search Report and the Written Opinion of the International Searching Authority, or the Declaration, PCT/US2009/045703, Jul. 29, 2009, Form PCT/ISA/220 (3 pages); PCT/ISA/210 (2 pages).
Ecuyer, M., "Using Skills-based Routing to Enhance Contact Center Revenue and Performance (Call Center/CRM Management Scope)," The Free Library (May 1, 2003) < http://www.thefreelibrary.com/Using+skills-based+routing+to+enhance+contact+center+revenue+and ...-a0102137613 >.
"California Inventors Develop Caller Identification Based Call Routing Feature," US Fed News Service, Including US State News, Jan. 29, 2008, pp. 1-2.
Konstantoulakis, G. et al., "Call Management Policy Specification for the Asterisk Telephone Private Branch Exchange," IEEE Workshop on Policies for Distributed Systems and Networks (Policy 2007), Jun. 13, 2007, pp. 1-11, Bologna, Italy.
"Remote access Radius attributes: Remote Access," Microsoft Technet, Microsoft Corporation, < http://technet.microsoft.com/en-us/library/cc728366(WS.10).aspx > (last updated Jan. 21, 2005).
Wang, H. et al., "Iceberg: An Internet-core Network Architecture for Integrated Communication," pp. 1-13, IEEE Personal Communications, vol. 7, Issue 4 (Aug. 2000).
Lam, D. et al., "Modeling Location Management in Personal Communication Services," Oct. 18, 1995, pp. 1-27, IEEE International Conference on Universal Personal Communications, 1996.
Lam, D. et al., "Teletraffic Modeling for Personal Communication Services," IEEE Communications Magazine, Feb. 1997, pp. 1-9, Stanford University.
Stokes, S. L. et al., "A Priority System to Improve Callback Success in Telephone Surveys," Proceedings of the Survey Research Methods Section American Statistical Association, 1990, pp. 742-747, University of Texas at Austin, Austin, Texas.
Maniatis, P. et al., "The Mobile People Architecture," ACM SIGMOBILE Mobile Computing and Communications Review, vol. 3, Issue 3 (Jul. 1999), pp. 36-42, see also, < http://portal.acm.org/citation.cfm?id=329153 >.
Cho, G. et al., "An Efficient Location and Routing Scheme for Mobile Computing Environments," IEEE Journal on Selected Areas in Communications, Jun. 1995, pp. 1-11, vol. 13, Issue 5.
Mintz-Habib, M. et al., A VoIP Emergency Services Architecture and Prorotype, "Computer Communications and Networks," Issue Date Oct. 17-19, 2005, pp. 1-6, Columbia University.
International Preliminary Report on Patentability in Application No. PCT/US2009/051751, dated May 5, 2011 (7 pages).
International Search Report for International Application No. PCT/US2009/045703 mailed Jul. 29, 2009 (2 pages).
International Search report and Written Opinion in International Application No. PCT/US2009/051751, dated Mar. 5, 2010.
International Search Report in International Application No. PCT/US2009/065976, dated Jul. 2, 2010.
International Written Opinion in International Application No. PCT/US2009/065976, dated May 26, 2011.
International Preliminary Report on Patentabiity in International Application No. PCT/US2009/065976, dated May 31, 2011.

(56) References Cited

OTHER PUBLICATIONS

International Search Report in International Application No. PCT/US2009/065038, dated Jul. 2, 2010.
International Written Opinion in International Application No. PCT/US2009/065038, dated May 24, 2011.
International Preliminary Report on Patentability in International Application No. PCT/US2009/065038, dated May 24, 2011.
International Search Report in International Application No. PCT/US2009/051768, dated Jun. 10, 2010.
International Written Opinion in International Application No. PCT/US2009/051768, dated May 25, 2011.
International Preliminary Report on Patentability in International Application No. PCT/US2009/051768, dated May 24, 2011.
International Search Report in International Application No. PCT/US2009/065985, dated Jun. 22, 2010.
International Written Opinion in International Application No. PCT/US2009/065985, dated May 25, 2011.
International Preliminary Report on Patentability in International Application No. PCT/US2009/065985, dated May 31, 2011.
International Search Report in International Application No. PCT/US2009/065055, dated Jul. 7, 2010.
International Written Opinion in International Application No. PCT/US2009/065055, dated May 24, 2011.
International Preliminary Report on Patentability on Patentability in International Application No. PCT/US2009/065055, dated May 24, 2011.
International Search Report in International Application No. PCT/US2009/065987, dated Jul. 14, 2010.
International Written Opinion in International Application No. PCT/US2009/065987, dated May 25, 2011.
International Preliminary Report on Patentability in International Application No. PCT/US2009/065987, dated May 31, 2011.
International Search Report in International Application No. PCT/US2009/051598, dated Apr. 1, 2010.
International Written Opinion in International Application No. PCT/2009/051598, dated Feb. 7, 2011.
International Preliminary Report on Patentability in International Application No. PCT/US2009/051598, dated Feb. 8, 2011.
International Search Report in International Application No. PCT/US2010/044196, dated May 3, 2011.
International Written Opinion in International Application No. PCT/US2010/044196, dated Mar. 1, 2012.
International Preliminary Report on Patentability in International Application No. PCT/US2010/044196, dated Mar. 6, 2012.
International Search Report in International Application No. PCT/US2010/052880, dated Jun. 30, 2011.
International Search Report in International Application No. PCT/US2010/058569, dated Aug. 22, 2011.
International Search Report in International Application No. PCT/US2010/022075, dated Jul. 28, 2011.
"Automated Phone Trees: Two Potential Solutions," [online] Jul. 5, 2009; retrieved from the Internet URL: http://developmentality.wordpress.com/2009/07/05/automated-phone-trees-two-potential-solutions/; 3 pages.
Asterisk, I., "Asterfax—Asterisk Fax," Aug. 25, 2007, XP002598206 retrieved form the Internet: URL: http://web.archive.org/web20070825233700/http://asterfax.sourceforge.net/index.html [retrieved on Aug. 24, 2010].
Kaluza, M., "Fax Services: Send Any Printable File From Your Program in Window 2000" MSDN Magazine, Aug. 31, 2001, XP002598207 retrieved from the Internet: URL: http://msdn.microsoft.com/en-us/magazine/cc301661.aspx [retrieved on Aug. 24, 2010].
European Search Report in European Patent Application No. 08835856.9-2414/2193654, dated Jan. 30, 2012.
International Written Opinion in International Application No. PCT/US2008/077683, dated Mar. 28, 2010.
International Preliminary Report on Patentability in International Application No. PCT/US2008/077683, dated Mar. 30, 2010.
International Initial Publication with ISR in International Application No. PCT/US2008/077683, dated Apr. 9, 2009.
European Search Report in Patent Application No. 08833690.4-1522/2193655, dated Sep. 9, 2010.

* cited by examiner

500

502

Call Greeting and Routing Rules

[Add a Rule] [View All]

510

Rule: [Business Hours ▼]   Edit Conditions
Conditions:   When:   Monday – Friday 9:00AM – 6:00PM

511

Select your Answering mode: [Full Call Control ▼]

512

1. Screen my calls

| | | |
|---|---|---|
| Play Introductory Greeting | "Thank you for calling" ▼ | [New] |
| Enable call screening | No ▼ | |
| Call screening prompt: | "Say your name:" ▼ | |
| Music On Hold | Ring tones ▼ | [New] |
| Interrupt music every: | Never (No prompts) ▼ | |
| Interrupt with prompt: | "Stay on the line" ▼ | |

514

2. Forward my calls

[✓] Notify my softphone and wait [2 ▼] seconds before forwarding
[ ] Forward my calls:   [Sequentially ▼]

| Active | Name | Number | Ring for | Option |
|---|---|---|---|---|
| [✓] | Home | 555-123-4567 | 2 rings | Edit |
| [ ] | Mobile | 888-123-4567 | 2 rings | Edit |

3. Take my messages   [Voicemail and FAX ▼]
   Play Introductory Greeting   [Default greeting ▼] [New]

TECHNIQUES FOR BYPASSING CALL SCREENING IN A CALL MESSAGING SYSTEM

BENEFIT CLAIM

This application claims the benefit under 35 U.S.C. §120 as a Continuation of application Ser. No. 13/615,335, filed Sep. 13, 2012; which claims the benefit under 35 U.S.C. §120 as a Continuation of application Ser. No. 12/237,213, filed Sep. 24, 2008, now U.S. Pat. No. 8,275,110, issued Sep. 25, 2012; which claims the benefit under 35 U.S.C. §119(e) of Provisional Appln. Ser. No. 60/995,965, filed Sep. 28, 2007, the entire contents of each of which is hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

TECHNICAL FIELD

Embodiments of the invention relate generally to computing devices and systems, as well as software, computer programs, applications, and user interfaces, and more particularly, to filtering, screening and dispatching calls in relation to a communication network for packetized and/or synchronous communications, including in situ filtering, screening and dispatching of active calls.

BACKGROUND

Traditional phone handling techniques to handle an incoming call are limited in capability. Presently, a callee typically screens a call through receipt of the caller's identification. A callee then has little flexibility when handling the call, especially when the callee is already connected to another caller. To illustrate, consider that a callee is connected to a first caller when a second caller rings through. Traditionally, the callee interrupts the connected call with the first caller (e.g., using "call waiting" technology) to communicate with the second caller. Or, the callee can allow the caller to pass to voice mail, which is accessed by the callee after the second caller records a message.

While traditional techniques for call screening electronic messages and calls are functional, there are certain drawbacks to these techniques. Call waiting technology is disruptive to communication. Further, typical voicemail screening techniques add a time delay to determine the subject matter of voice message, as a callee usually accesses the content of the voicemail after the caller has completed recording a message (i.e., one-way communication). The callee then dials or otherwise rings the caller to complete communication between the two parties. In some cases, conventional approaches usually provide relatively rigid rules than enable a callee to enact predetermined call handling options.

It would be desirable to provide computing devices and systems, as well as software, computer programs, applications, and user interfaces that minimize one or more of the drawbacks associated with the conventional techniques for screening calls via packetized and/or synchronous communication networks.

BRIEF DESCRIPTION OF THE DRAWINGS

The invention and its various embodiments are more fully appreciated in connection with the following detailed description taken in conjunction with the accompanying drawings, in which:

FIG. 5 is a diagram showing an example of an interface that can be implemented to configure call greeting and routing rules, according to at least one embodiment of the invention;

Like reference numerals refer to corresponding parts throughout the several views of the drawings. Note that most of the reference numerals include one or two left-most digits that generally identify the figure that first introduces that reference number.

DETAILED DESCRIPTION

Figure 1:
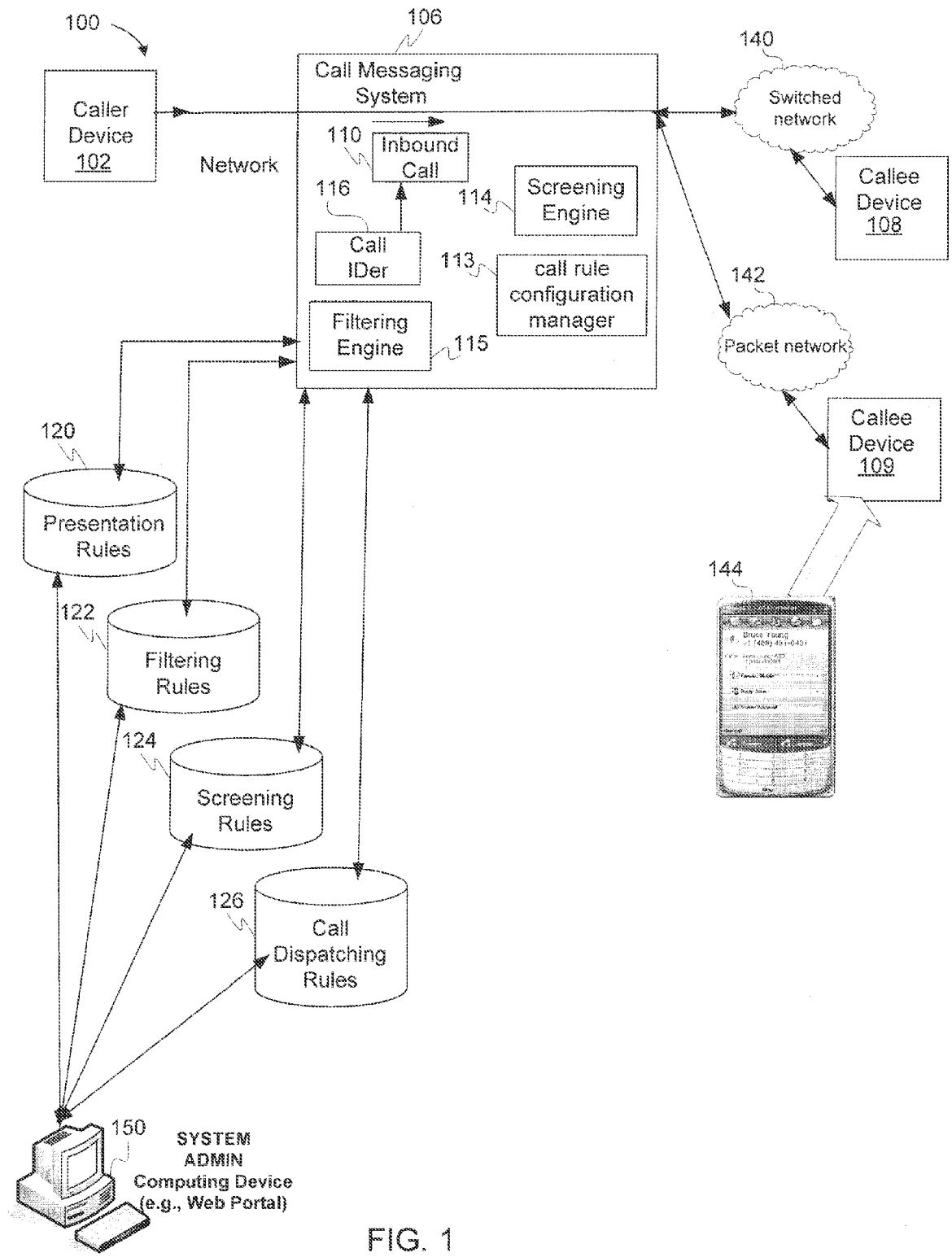
FIG. 1 is a diagram of a call messaging system, according to at least one embodiment of the invention.

FIG. 1 is a diagram 100 of a call messaging system, according to at least one embodiment of the invention. As shown, a call messaging system 106 is configured to analyze at least inbound calls, such as inbound call 110, that originate at a caller device 102 and traverse via either switched network 140 to a callee device 108, or packet network 142 to a callee device 109. Call messaging system 106 includes a call identifier ("Call IDer") 116, a call rule configuration manager 113, a filtering engine 115, and a screening engine 114. Call identifier 116 can be configured to determine a number of call attributes of inbound call 110, including the identity of caller device 102. Filtering engine 115 can be configured to filter calls in association with repository 122, whereas screening engine 114 can be configured to screen calls in accordance with repository 124. In various embodiments, call messaging system 106 can provide called parties several actions, including inbound call notification, screening, filtering and dispatching alternative. A user (e.g., a subscriber associated with call messaging system 106) can use one or more interfaces to configure inbound call treatment rules, the interfaces including hosted web pages, computer client software, a telephone user interface, and the like. With one or more of these system interface technologies, an end user can configure rules for call presentation, call routing, call screening, call filtering, call greeting, call answering, and the like. With configurable call forwarding, call denial, do not answer, time of day and other call treatment policies, VoIP customers can forward calls directed initially to their IP phones and computing device-based softphones to alternative devices including voicemail, cell phones and home or other public switched telephone network (PSTN) endpoints. Caller device 102, callee device 108, and callee device 109 can be any of the following communication endpoint types: an analog (PSTN) telephone, an IP (VoIP) phone, an email address, a pager, a symmetric messaging service destination address, or some other alert mechanism (e.g., a pager).

In one embodiment, call rule configuration manager 113 is configured to manage the modification of presentation rules in repository 120, filtering rules in repository 122, screening rules in repository 124, and call dispatching rules in repository 126. Either system administrator at computing device 150 or any of caller device 102, callee device 108, and callee device 109, if authorized, can interface with call rule configuration manager 113 to modify the rules. Repository 120 can include presenting rules, such as "do not disturb" rules, "forward calls to a provisioned telephone number" rules, "forward calls to an entered telephone number" rules, "bypass forwarding call plans for the next call" rules, "bypass forwarding call plans for some time duration" rules, "bypass all forwarding call plans" rules, "activate call routing plans from menu selections" rules, and the like. As an example, a caller that is leaving a user a voice message can be presented with call routing plans customized according to their caller ID or to a personal identification number (PIN). The caller can select a subsequent call routing plan from memory or can have the voice mail system play (i.e., present visually or audibly) available call routing plans, whereby the caller selects either none, one or multiple call routing plans from the presentations. According to at least some embodiments, the term "presentation rule" can refer to a rule or a subset of processes for governing the presentation of call routing options or prompts to a user, the options or prompts being useable to invoke filtering, screening, or dispatching processes.

Call rule configuration manager 113 can be configured to manage the modification of filtering rules in repository 122, according to one embodiment. According to at least some embodiments, the term "filtering rule" can refer to a rule or a subset of processes for governing the filtering of a call based on user-defined criteria that can invoke, for example, predetermined call routing prior to a call being received by callee devices 108 or 109. In some instances, a filtering rule can be applied to a call at call messaging system 106. In some embodiments, filtering can include rejecting or forwarding a call based on predetermined rules. For example, a user may apply a filtering rule to reject or forward all incoming calls ("do not disturb"), or may specify a time of day, day of week, caller ID or the like to selectively reject or forward incoming calls. A user can provision the call routing system to play specific messages to callers, based upon the caller ID, caller history, the time of day, the call frequency, or from any combination of conditions.

Call rule configuration manager 113 can be configured to manage the modification of screening rules in repository 124, according to one embodiment. These rules can define default prompts, and a user can replace or augment these with personal prompts to ask a caller to provide identification. For example, consider that a caller to a telephone number has a menu played. The first menu item can be a prompt asking for the user name or the reason for this call or other information. The caller answers with some reason, and this reason is played to the callee. By listening to the reason and viewing the caller-ID, the callee can decide how to dispatch this call. For example, the following are applicable actions: answer this call, send this call to voice mail, send this call to another agent, and let callee or system default policies route this call. Note that speech recognition can evaluate and parse the caller reason for key words. Speech recognition of keywords can dispatch this call to user or system defined routing rules or to available agents. According to at least some embodiments, the term "screening rule" can refer to a rule or a subset of processes for governing the screening of an active call at callee devices 108 or 109. In some instances, a screening rule can be applied to control which prompt or option can be presented and selected at callee devices 108 or 109. For example, screening rules can specify whether to present prompts or options to forward an active call, send an active call to voice mail and listen to the voice message as it is being recorded, communicate (e.g., by way of selecting a response, such as "I will call you back") with the caller initiating the active call without, for example, interrupting a connected call in which the callee is already participating, and the like. A screening rule can be described as either a "default screening rule" or a "customized screening rule." The term "default screening rule" can refer, at least in some embodiments, to predetermined rules that define how to screen calls prior to a callee device receiving a call, whereas the term "customized screening rule" can refer, at least in some embodiments, to rules that dynamically can be implemented to screen calls as a call is received at a callee device, without interrupting a pending other call.

Call rule configuration manager 113 can be configured to manage the modification of call dispatching rules in repository 126, according to one embodiment. According to at least some embodiments, the term "dispatching rule" can refer to a rule or a subset of processes for governing the actions that can be initiated at callee devices 108 or 109 to dispatch an active call. In some instances, a dispatching rule can be applied to control whether to perform any of the actions of forwarding an active call, sending an active call to voice mail (e.g., and listening to the voice message as it is being recorded), communicating with the caller initiating the active call, and the like. In particular, repository 126 can include rules relating to how to add prompts, speech recognition, and call dispatching rules to a user menu answer tree. The entire menu answer tree or parts of those rules can be reviewed, edited, saved from hosted web pages (e.g., computing device 150), client applications, cell phone browsers and audio playback and edit routines. The menu answer tree and dispatching options can change with the time and date, with the caller-ID, with callee availability, and with scheduling tools, such as a calendaring system. In some embodiments, a dispatching action can be performed at callee device 108. In other embodiments, a dispatching action can be performed at call messaging system 106 or at a combination of elements shown in FIG. 1.

Screening engine 114 can be configured to implement call screening in association with either callee 108 or callee device 109, according to one embodiment. For example, when an inbound call rings a callee telephone, the callee (a potential destination answering endpoint) can lift the handset and hear menu options. For example, the callee might hear "Caller (name) from telephone (number) is calling. Select 1 to answer, 2 to send to voice mail, 3 to play a response, 4 to direct contact information to your PC client, 5 to display contact history on your web browser." If the callee has information displayed on their computing device 109 or via a web browser, then the callee can view additional caller information by moving the PC mouse (or other cursor) over the caller name, a contact directory, or over a "More Information" or "Help" icon. The result can show caller information and caller history, or call routing options or people available to accept this call. According to at least some embodiments, screening engine 114 can be configured to effect active call screening and dispatching. In some instances, screening engine 114 can be configured to perform one or more of the following: present screening prompts at callee devices 108 or 109; receive a response or input from the callee via user inputs; and, perform an action to dispatch with the active call. According to at least some embodiments, the functionalities and/or structures of screening engine 114 (or portions thereof) can be implemented in call messaging system 106, callee device 108, or callee device 109, or a combination thereof. For purposes of describing the various embodiments of the invention, the term "active call" can refer, at least in some cases, to a call made by a caller over any communications network, such that a callee receives a notification (for example, a ringing signal) that the call is pending, but the call is not yet connected at the callee. Further, the term "active call" also can refer to a call routed responsive to, for example, user inputs provided to a call messaging system in situ to screen and dispatch an incoming call. As used herein, the term "in situ" can refer, at least in some embodiments, to initiating an action during the pendency of an 5 incoming call while, for example, an original connection with another active call is maintained interrupted (i.e., a first call to a callee need not be interrupted by a second call that is yet to be connected). Thus, an incoming call can be screened and dispatched without connecting to the incoming call, and without interrupting the original connection with the other active call. For example, call dispatching actions can be applied in situ to an active call being recorded as a voice message to listen to a voice message as it is recorded. In other examples, call dispatching actions can connect the callee to the caller during the voice message recording, and to do other similar actions.

In one embodiment, call messaging system 106 can be configured to enable a called party at callee device 108 to override the default system filtering, screening and call routing rules. For example, call messaging system 106 can implement a policy to block calls without caller ID, or a policy to block call transfers during a time-of-day, due to system activity, or from some other combination of call dispatching policies. In some embodiments, callee device 108 can be configured to generate a prompt that, if selected, can override filtering rules (e.g., predetermined filtering rules) to dispatch an active call. In other embodiments, call messaging system 106 can be configured to enable a called party at callee device 108 to override the user-customized system filtering, screening and call routing rules.

Depending upon the policies and system activity, call messaging system 106 can deliver to a caller options to leave voice mail or wait for an available endpoint. The caller can select the type of waiting, such as to select "1" to have the first available person call back, select "2" to listen to music (and then select between or among subsequent options to select their preferred type of music), and select "3" to leave voice mail. Call messaging system 106 can park the caller/inbound call in a media server (or other servers configured to perform similar functions) and can follow call routing rules, such as a rule to notify one or more parties about the incoming call and to direct a party to pick up the call from a parked location that is transparent to the callee. Thus, the call routing system can notify one or more parties about an incoming call, thereby enabling the caller to be picked up without the callee knowing the parking method or parking slot that otherwise requires a caller to identify a specific extension or location at which to connect with the call.

In one embodiment, a software application implementing a softphone 144 can is able to carry out call answering and call dialing. For example, when enabled, the softphone 144 can receive notification of an inbound call. Notifications can be for one specific user, for a specific set of users, or for a large group of users where a user is identified by one or more telephone numbers. Softphone 144 can be configured to notify one or more callee's for all, or a defined subset, of incoming calls. For example, a softphone 144 may be used to notify a callee about incoming priority calls where priority is determined by time of day, detected presence, temporary duration policies, and other policies. Depending upon the enabled policy, softphone 144 can display caller-ID, destination number, contact name and information, call routing options, and other significant caller information. Additionally, softphone 144 can enable mouse-over actions to display additional caller information, such as a contact directory, caller contact history, call routing options, and people available to accept this call. Softphone 144 can be enabled to route incoming and parked calls. Softphone 144 can also select announcements to play back for one or for a group of calls. Softphone 144 can accept written text or text input by typing, by selecting existing text or "scraping" a web site or a document for preferred text and then converting the text to speech. Selected and "scraped" text may be edited in the softphone 144 before conversion to speech. Softphone 144 can listen to voice-mail in real-time as it is being recorded. Thus, softphone 144 can act as a real-time screening device and allows the user to interrupt a voice mail call (to "barge in") and disconnect or talk with the caller. The user can stop softphone 144 from listening to a recorded voice mail. Using softphone 144, a user can monitor the status of active calls and can barge into an active call making a 3-way conference, or the user can block the current callee from joining the conference. In addition, the user can whisper (i.e., communication to a subset of callees and callers in a multiple party call, such as a teleconference) to the callee without the caller hearing the whispered conversation.

Note that network 104 can include packet networks and switched networks, as well as any other suitable communications network. For example, private and/or public internet and switching networks can be used, such as IP networks (including protocols TCP, UDP, HTTP, etc.) and switched networks (including public switched telephone networks ("PSTN") or the like, as well as cellular (e.g., a digital cellular network), short message service ("SMS") and other wireless networks.)

Figure 2:
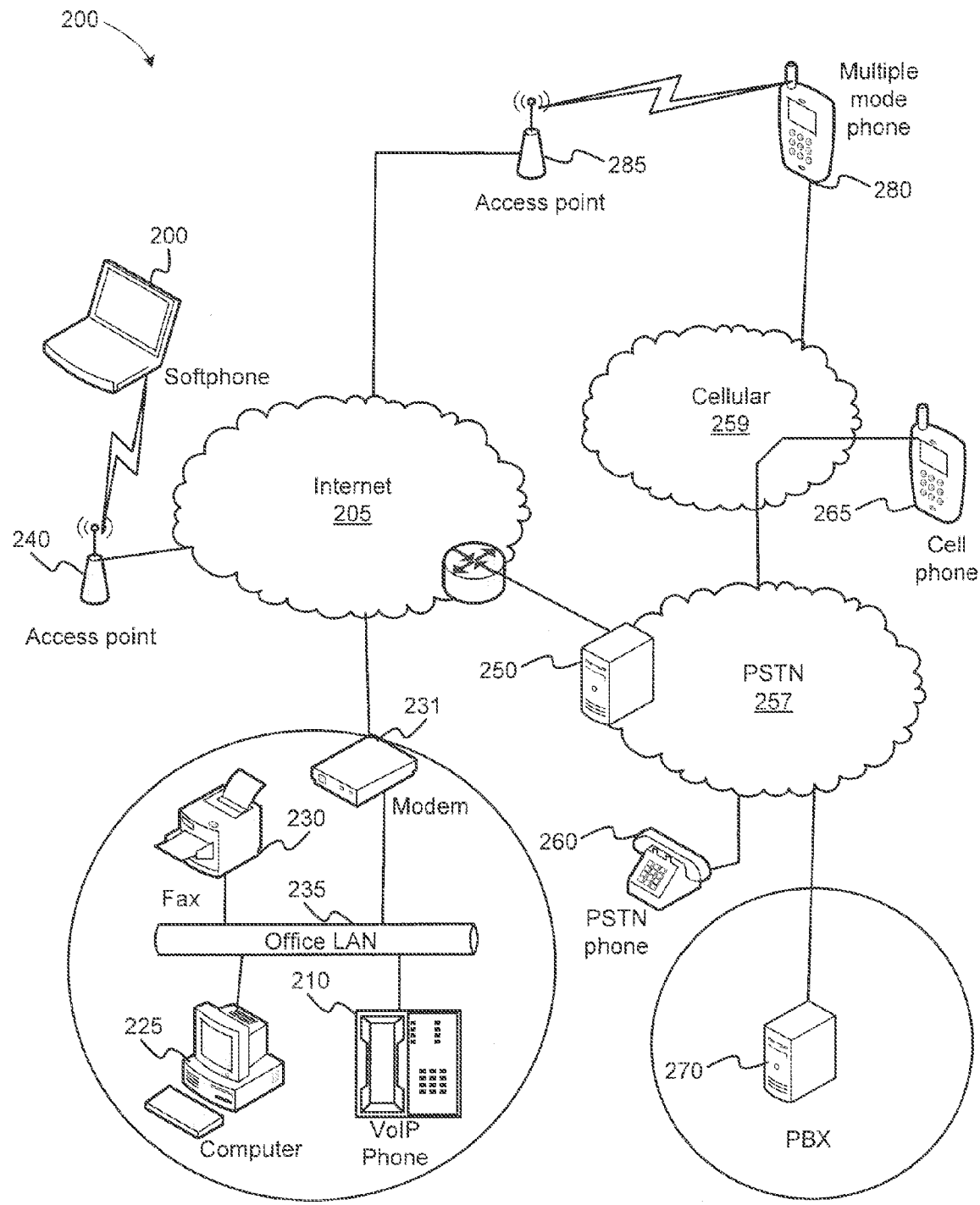
FIG. 2 is a diagram of a variety of endpoints that can interact with a call messaging system, according to at least one embodiment of the invention.

FIG. 2 is a diagram 201 of a variety of endpoints that can interact with a call messaging system, according to at least one embodiment of the invention. A call messaging system can perform inbound call identification when any of the following initiates a call: PSTN endpoints 260, enterprise PBX endpoints 270, Fax endpoints (230), cellular endpoints 265, dual mode endpoints 280 and VoIP endpoints 210 and 220, and the like. Any of these endpoints can be configured to operate as caller device 102, callee device 108, or alternate callee device 109, examples of which are shown in FIG. 1. In at least some embodiments, dual mode endpoint 280 can be a mobile computing device, such as a mobile communications device (e.g., a hand-held cellular phone), configured to access a cellular network 259 and a wireless network, such as a network configured to implement IEEE 802.11 technology (e.g., 802.11g, 802.11b, or the like).

Figure 3:
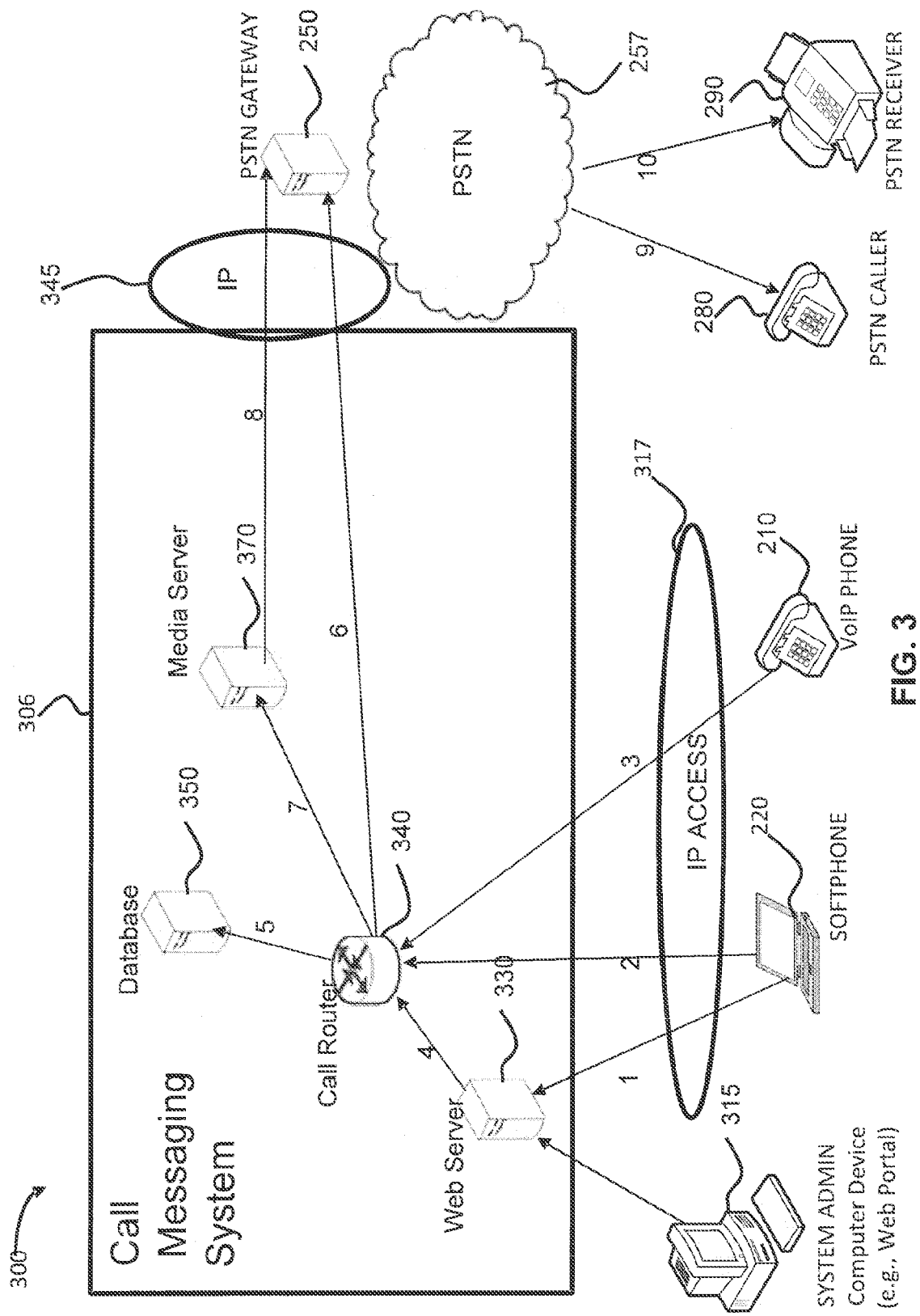
FIG. 3 is a diagram of a call messaging system that is configured to filter and screen calls, according to at least one embodiment of the invention.

FIG. 3 is a diagram of a call messaging system that is configured to filter and screen calls, according to at least one embodiment of the invention. Filtering and screening can be invoked by call endpoints 210 (FIG. 2), 280 (FIG. 2), 290, a web application hosted at web server 330, a software program ("softphone") 220 (FIG. 2) acting as an active call control agent, a media server 370, and/or a hosted call processing server 340, such as call router 340. Call messaging system 306 can include call router 340, which can be a circuit switch or softswitch configured to receive inbound calls from a first caller device 280, the same or another circuit call router 340 being configured to route the inbound call to a desired destination. For example, call router 340 can be configured to route an inbound call to media server 370 to play announcements to first caller device 280, or call router 340 can be configured to cause media server 370 to play announcements to another telephone, such as via a PSTN gateway 250 to one or more public switched telephone network devices 290. Call messaging system 306 can include a Database 350 or any other storage mechanism for maintaining rules for filtering, announcing and routing an inbound call, and subsequent actions to: modify filter and screen rules, implement filtering, and implement screening. Networks 317 and 345 can be IP networks.

Call messaging system 306 can also include one or more configuration tools including a Web Server 330 to configure the rules for filtering, announcing, routing and completing calls. A computing device 315-as a system administrator or an authorized user-can configure web server 330 to modify call action rules stored, for example, in repositories 120, 122, 124, and 126 (FIG. 1). As such, computing device 315 and/or web server 330 can maintain a Database 350 (or any other storage mechanism) for storing system administrator rules and/or end user defined rules. Examples of some tools that support inbound call processing and notification include client applications, such as contact management, appointment and calendar systems, any of which can be found in, for example, an email program.

Database 350 can store call history information for each inbound call, including active call identifiers (e.g., caller IDs) to receive call status and send active call commands. For example, database 350 can maintain data representing a first party calling-ID (ANI), a type of endpoint associated with the first calling party, such as a PSTN phone 280, a second destination endpoint DNIS, a result code (e.g., indicating a recipient status) if the call was connected or not connected, and the result of each prior call (e.g., whether the previous call history includes no answers at callee device 108 of FIG. 1). Database 350 can also be configured to retain customer credit information, satisfaction information, and other customer profile information associated with each inbound caller-ID. Database 350 also can store call transfer, conferencing, recording, and customer feedback information.

Call messaging system 306 can include a database 350 that maintains default inbound call routing rules as well as user-defined call screening, media server prompts, call notification rules, default and user-defined dispatching rules. The Database 350 can contain inbound call routing rule duration timers to apply routing rules, for example, during business and non-business hours, and the circuit switch or softswitch 340 can apply the rule duration timer to each inbound call routing rule. The Database 350 can collect call answering endpoint information and revise call routing rules to include those endpoints in future call routing rules when an inbound call includes a matching caller ID.

End-users 210, 220, and 290 can define and store in the Database 350 custom call routing rules to augment or override the default call routing rules. Typically, end-users use the Web Server 330 interface to define custom call routing rules. End-users can also use a client application or the PSTN interface 290 to configure and select custom call routing rules.

For each inbound call, the circuit switch or softswitch 340 applies the identified inbound caller ID (ANI) and the Database 350 stored information and policies, which can include caller history, user-defined call routing policies, timers, and endpoint presence status, to filter and route the inbound call to a media server 370 or to one or multiple endpoints 210, 220, and 290. From the identified inbound caller ID and any stored information associated with the caller, the Database 350 can assign a priority to the inbound call.

Additionally, for each call routing, the circuit switch or softswitch 340 can access any of the default endpoint, the saved ANI, and the saved actual first calling endpoint and can apply all user-defined routing rules simultaneously or sequentially to ring any or all of these stored endpoints. Also, if the receiver is busy, then for a high priority call, the switch 340 can facilitate a caller to barge in to connect the inbound call to a receiving endpoint 210, 220, and 290. Similarly, a priority call can be conferenced into ongoing call endpoints.

In various embodiments, call messaging system 306 can provide a web interface, a softphone, default administrator configurations, and user-defined preferences to alert potential call receivers, enabling them to make decisions concerning which calls to answer, to redirect, and to ignore. The Database 350 can maintain system-defined and user-defined call data including prior call history, the inbound call information (including ANI, DNIS, CNAM), caller contact information, and other pertinent caller information. Embodiments of the invention can present any or all of this information to one or more potential call receivers allowing the receiver to choose whether to answer, how to direct the call elsewhere, and whether to ignore the inbound call.

Each user or the system administrator can allow or disallow a caller to barge in by interrupting an ongoing call to talk to one of the current call endpoints. As another option, from the caller parameters and assigned priority, the proposed system can add a call to an existing conference call. During any caller response analysis, the system 306 can park the inbound call at a media server 370 or other device interface, until the call disposition is decided and accepted by one or more call receivers. Further, each end-user 210, 220, and 290 can listen as a caller leaves a voice mail message and elect among disconnecting the call from voice mail, answering the call and disconnecting voice mail, cancelling the call and dropping the call from voice mail, and closing inbound call screening.

Figure 4:
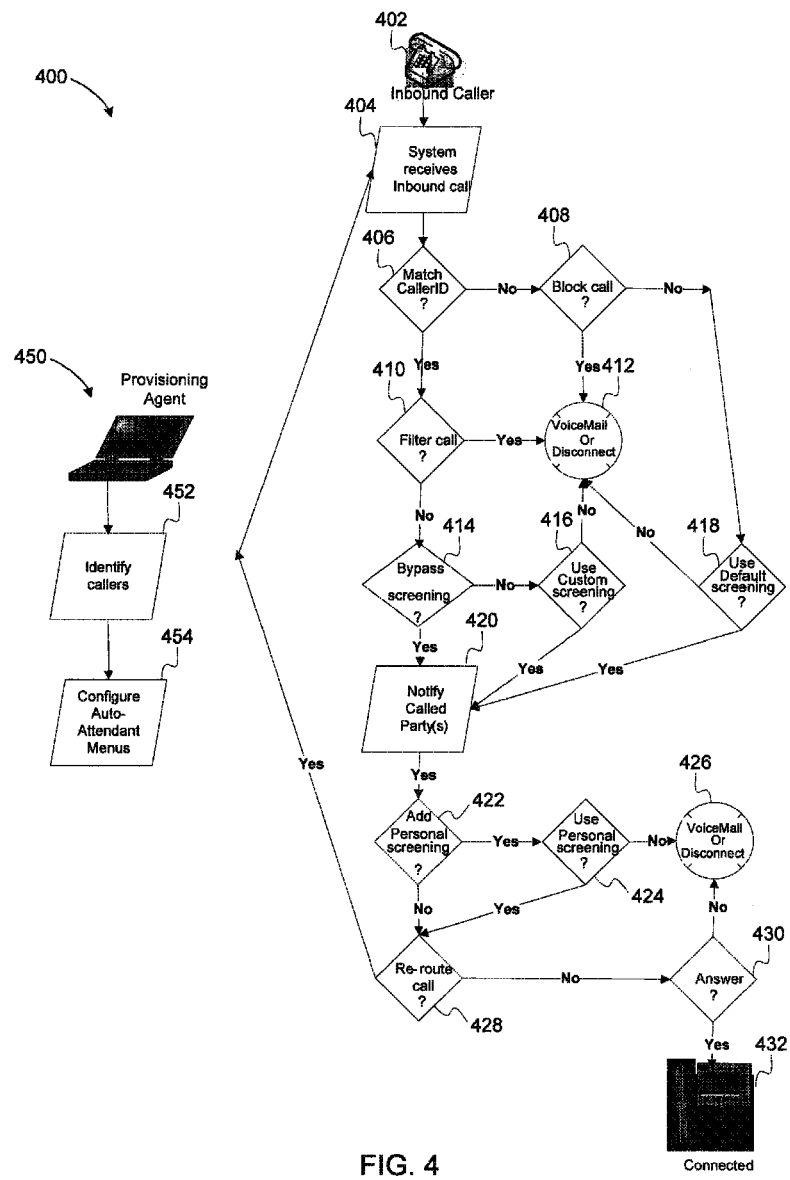
FIG. 4 is a flow diagram depicting an example of a method of processing active calls, according to at least one embodiment of the invention.
Figure 6A:
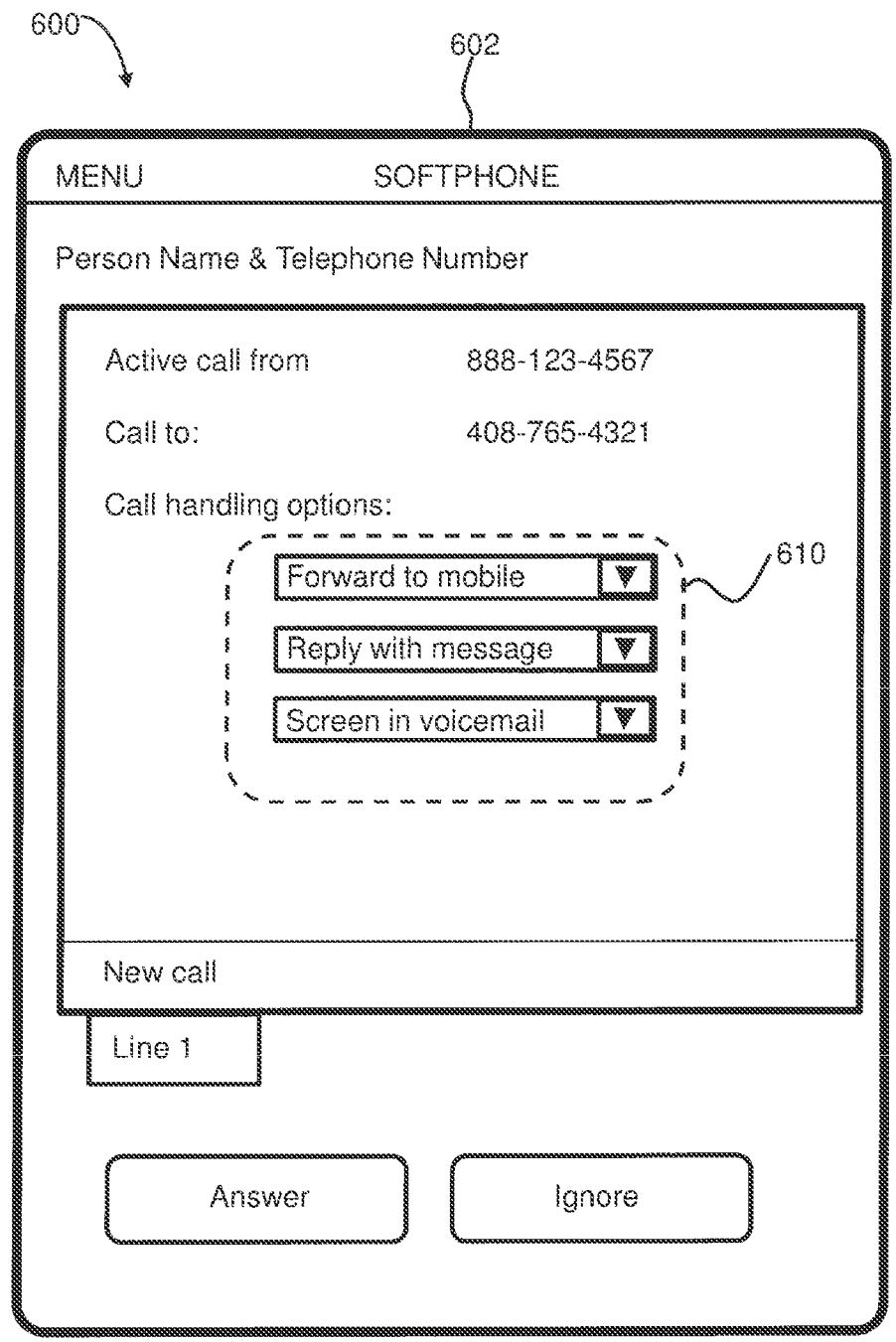
FIG. 6A is a diagram showing an example of an interface configured to facilitate active call processing at an endpoint, according to at least one embodiment of the invention.
Figure 6B:
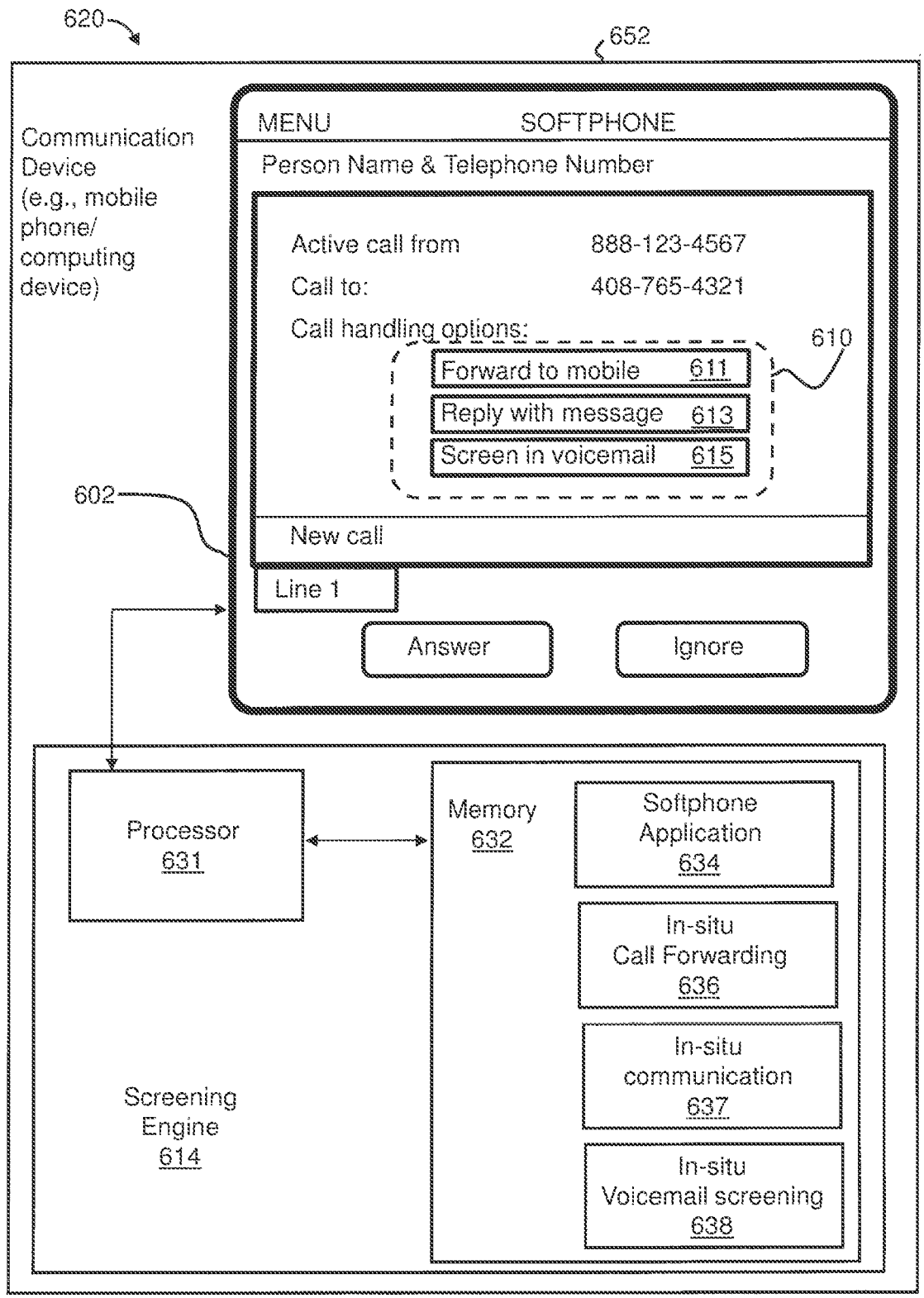
FIG. 6B is a diagram showing an example of an endpoint configured to process calls and notifications via an interface, according to at least one embodiment of the invention.
Figure 6C:
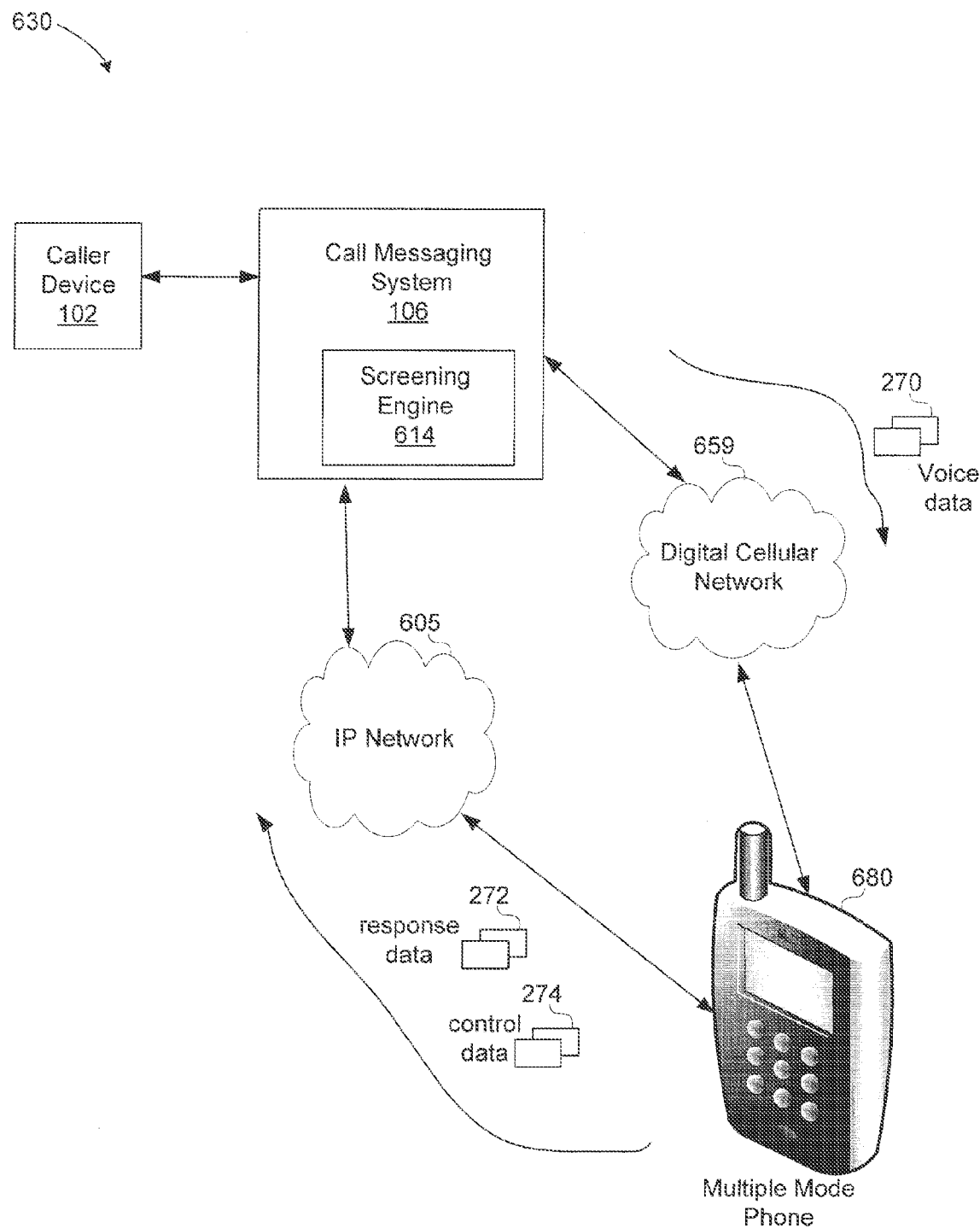
FIG. 6C is a diagram showing an alternative example of a communication device configured to process calls and notifications, according to at least one embodiment of the invention.

FIG. 4 depicts a flow diagram 400 as an example of a method of filtering and/or screening calls, according to at least one embodiment of the invention. The call messaging system can be configured to receive an inbound call 404 between a caller device 402 and a callee device 432. At 406, the call messaging system can determine whether a caller has a matching caller ID. In some embodiments, the call messaging system can use other attributes associated with the call to specify whether to apply filtering rules in handling the call. If yes, then flow 400 filters call at 410. In some embodiments, the call messaging system can apply filtering rules that specify, for example, predetermined actions based on the caller ID, caller history, time of day, call frequency, or any other condition. If no, then the flow continues from 406 to 408, at which call messaging system determines whether to block the call (e.g., in response to a filtering rule). If yes, the call is disconnected at 412, otherwise flow 400 continues to 418, at which the call is screened using default screening rules. If default screening rules are implemented and default call screening occurs, then flow moves to 420. Otherwise the flow moves back to 412 to direct the caller to voicemail at 412. Back at 410, if call messaging system filters the call, then the flow passes to 412, otherwise the flow continues to 414 to determine whether to bypass screening, thereby overriding the use of custom rules at 416. In at least some embodiments, a call messaging system can be configured to enable a caller (or the call messaging system itself) to bypass a callee's customized rules for screening call based on a bypass condition. For example, if an incoming call is associated with a relatively high priority as bypass condition, then a call messaging system can, for example, bypass or otherwise disable the use of customized screening rules (and/or default screening rules and filtering rules). For example, if an emergency phone call (i.e., a 911 call) originates from device 432, which later is disconnected or otherwise fails to connect to device 402, then a call messaging system can detect a call generating from device 402 and enable a call originating at device 402 to bypass the custom screening so that emergency officials can quickly connect with a callee at caller device 432 without being impeded by the customized screening. As used herein, a "bypass condition" is an event that causes a rule is to be avoided or bypassed based on call attributes and any other factor. If there is no bypass condition, flow 400 continues to 416 at which custom screening (and customized screening rules) can be applied. If the screening is bypassed at 414, or if the customized screening continues at 416, then the flow continues 420 to notify the called party (e.g., the callee). Next, flow 400 continues to 422 at which a determination is made as to whether to screen the call (e.g., determine whether in situ screening of an active call is available or activated, whereby "personal screening" is performed at the called device during the active call). As used herein, the term "personal screening" can refer, at least in some embodiments, to screening and dispatching of calls, for example, without interrupting a connection without another call (i.e., without performing a "call waiting" action, or any other action that disrupts communication in a call). Further, personal screening can be initiated at a callee device rather than at a call messaging system, according to some embodiments. Examples of implementing personal screening are shown in FIGS. 6A to 6C. If so, then the flow moves to 424 to determine whether the called party passes the call through to perform personal call screening. In at least some embodiments, a callee device can generate prompts as described in FIGS. 6A to 8, discussed herein below, to implement in situ screening of active calls. If not, the flow moves to 426 either to place the call in voicemail or to disconnect. The flow moves to 428 to determine whether to re-route the call when neither personal screening is to be added at 422 nor personal screen is to be used at 424. If so, then flow 400 returns to 404 (e.g., a state in which other calls can be filtered, screened, and/or dispatched), but if not, then the flow goes to 430 at which the callee at 432 answers the call at 430. Note, too, a provisioning agent 450 can identify callers at 452 and then configure an auto-attendant menu at 454 to, for example, implement filtering, screening, and/or dispatching, according to various embodiments. In some embodiments, provisioning agent 450 can include instructions executed by, for example, a computing device 150 of FIG. 1, or a computing or communication device associated with softphone 144 of FIG. 1.

FIG. 5 is a diagram 500 showing an example of an interface that can be implemented to configure call greeting and routing rules, according to at least one embodiment of the invention. Here, interface 502 includes an input field 510 to create a rule, an input field 511 to select an answering mode, an input field 512 to screen calls, and an input field 514 to forward calls. For instance, input field 510 can specify a time-of-day during which to use, for example, filtering rules. Input field 514 can provide for call forwarding in according with predetermined or default filtering rules.

FIG. 6A is a diagram 600 showing an example of an interface configured to screen calls in situ at an endpoint, according to at least one embodiment of the invention. Portion 610 of interface 602 presents a subset of prompts that a user can use during an active call to forward a call, reply via text messaging, or screen into voicemail.

FIG. 6B is a diagram showing an example of an endpoint configured to process calls and notifications via an interface, according to at least one embodiment of the invention. As shown here, an endpoint is depicted as a communication device 652, which can be a mobile communication device that includes an interface 602, and a screening engine 614 configured to provide for in situ screening of active calls. Screening engine 614 can include a processor configured to execute instructions from memory 632, the instructions constituting a softphone application 634, which can be an application configured to adapt a computing device to implement various known telephony specifications and/or standards. Communication device 652 can be configured to receive data representing call attributes with which communication device 652 can use to determine whether to screen an incoming active call. In various embodiments, communication device 652 can be any of PSTN endpoints 260, fax endpoints 230, cellular endpoints 265, VoIP endpoints 210 and 220, and dual mode endpoints 280, and the like, as shown, for example, in FIG. 2.

In operation, screening engine 614 can be configured to screen and dispatch an inbound call. While a call is active (i.e. still pending), communication device 652 can present a subset of prompts in association with interface 602. The prompts provide a callee with various action options regarding the inbound call based on, for example, screening rules 124 and call dispatching rules 126 of FIG. 1. After callee selects from the various action options, communication device 652 can communicate with a call messaging system to implement the selected dispatching action or can perform the dispatching action itself. Prompt 611 as a user input can be configured to provide in situ call forwarding. Upon detecting selection of prompt 611, processor 631 can execute instructions of the in situ call forwarding module 636 to provide for call forwarding of an active call. For example, in situ call forwarding module 636 can provide for overriding of default filtering rules (e.g., predetermine forwarding rules), as well as for specifying a destination number to which a call can be forwarded in real time (i.e., during the pendency of the active call).

Upon detecting selection of prompt 613, processor 631 can execute instructions of the in situ communication module 637 to provide communication with the caller during an active call. For example, in situ communication module 637 can generate a response to the caller without the callee device (e.g., communication device 652) connecting with the caller device. In some instances, the response can be selected as one of a number of responses to provide the caller with, for example, a predetermined voice response (i.e., "I will call you soon."). In at least one instance, the response can be generated during the pendency of an active call (e.g., the callee can enter text into interface 602 that can be transmitted as text or as text-to-speech audio).

Upon detecting selection of prompt 615, processor 631 can execute instructions of the in situ voicemail screening module 638 to provide for voice message screening of an active call by the callee during the recording of the voice message, and optionally, connecting with the caller during the recording of the voice message.

Figure 7:
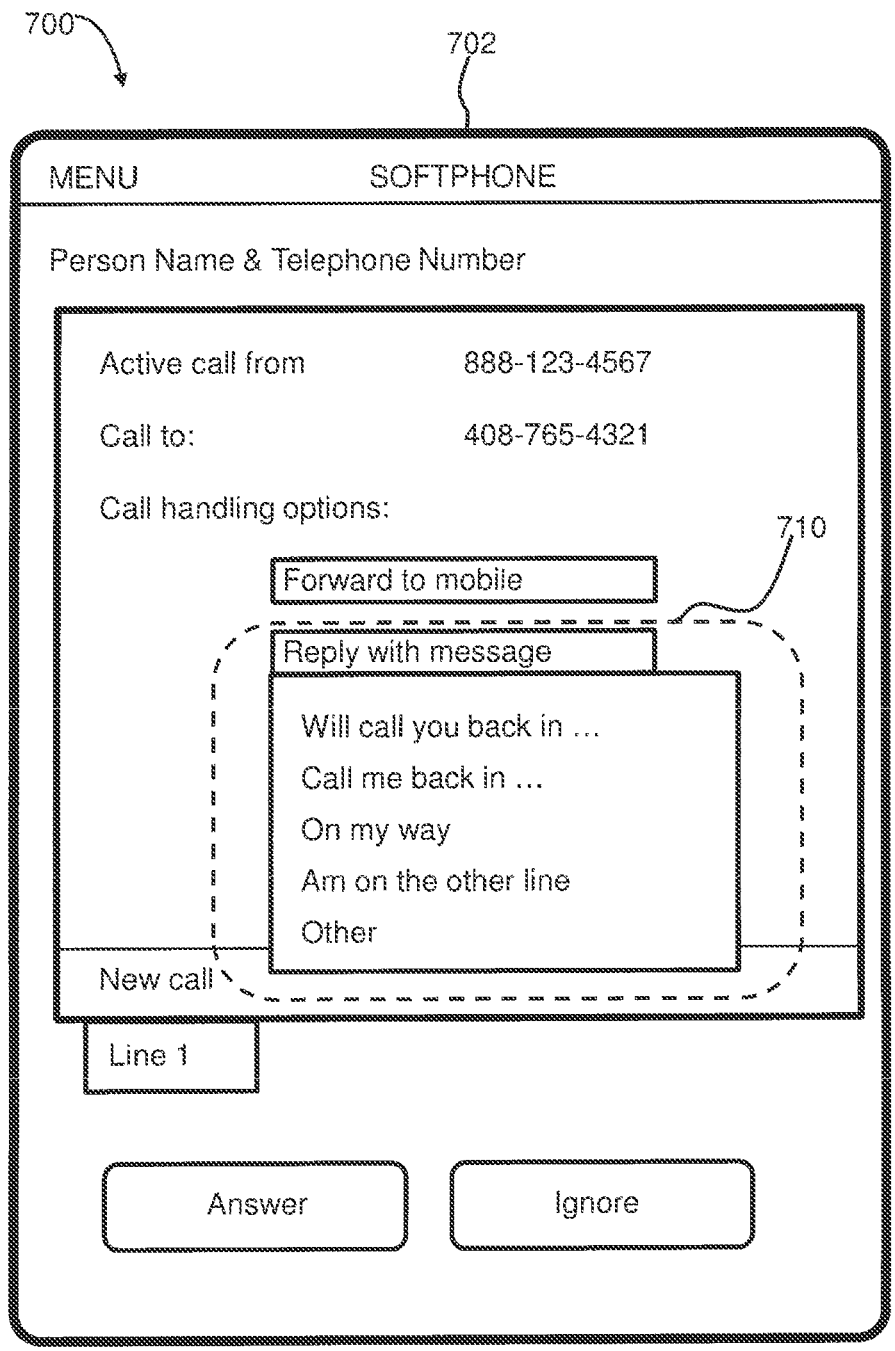
FIG. 7 is a diagram showing an example of an interface configured to send a message in situ between endpoints, according to at least one embodiment of the invention.

FIG. 6C is a diagram 630 showing an alternative example of a communication device configured to process calls and notifications, according to at least one embodiment of the invention. In one embodiment, multiple mode phone 680 can be configured to transmit and receive over multiple channels (two or more) that can include wireless channels that convey IP packets and digital cellular phone packets. In some embodiments, multiple mode phone 680 can be used by callee to transmit call data and response data 272 (e.g. forwarding instructions, text, text-to-speech commands, listen to voicemail while recording) and control data 274 to a call messaging system, such as call messaging system 106 through IP network 605 (including protocols TCP, UDP, HTTP, etc.), or through digital cellular network 659 (not shown). Control data 274 can include data configured to cause screening engine 614 (FIG. 6B) to screen an active call at a call messaging system, such as call messaging system 106. Response data 272 can be embedded in IP packets, such as in emails, text messages, instant messaging, and the like, and/or can be embedded in messages that can be transmitted via digital cellular network 259, such as SMS messages. Voice data 270 can be transmitted via digital cellular network 259 (or IP network 605, which is not shown). Digital cellular network 659 can be any of the following digital cellular technologies, including: Global System for Mobile Communications (GSM), General Packet Radio Service (GPRS), Code Division Multiple Access (CDMA), and the like FIG. 7 is a diagram 700 showing an example of an interface configured to send a message in situ between endpoints, according to at least one embodiment of the invention. Portion 710 of interface 702 presents a subset of selectable message responses, either text or audio, that a callee can send to a caller in situ during the pendency of an active call (e.g., without connecting to the caller). In one example, portion of interface 710 allows the called party to insert text into the callee device and convert the text in situ to audio playback to the caller, or insert a pre-recorded message and playback in situ to the caller. Examples of other responses include text input by typing, text input by selecting existing text or "scraping" a web site or a document for preferred text. Other examples include converting the text to speech, or the like. Selected text and "scraped" text may be edited before conversion to speech.

Figure 8:
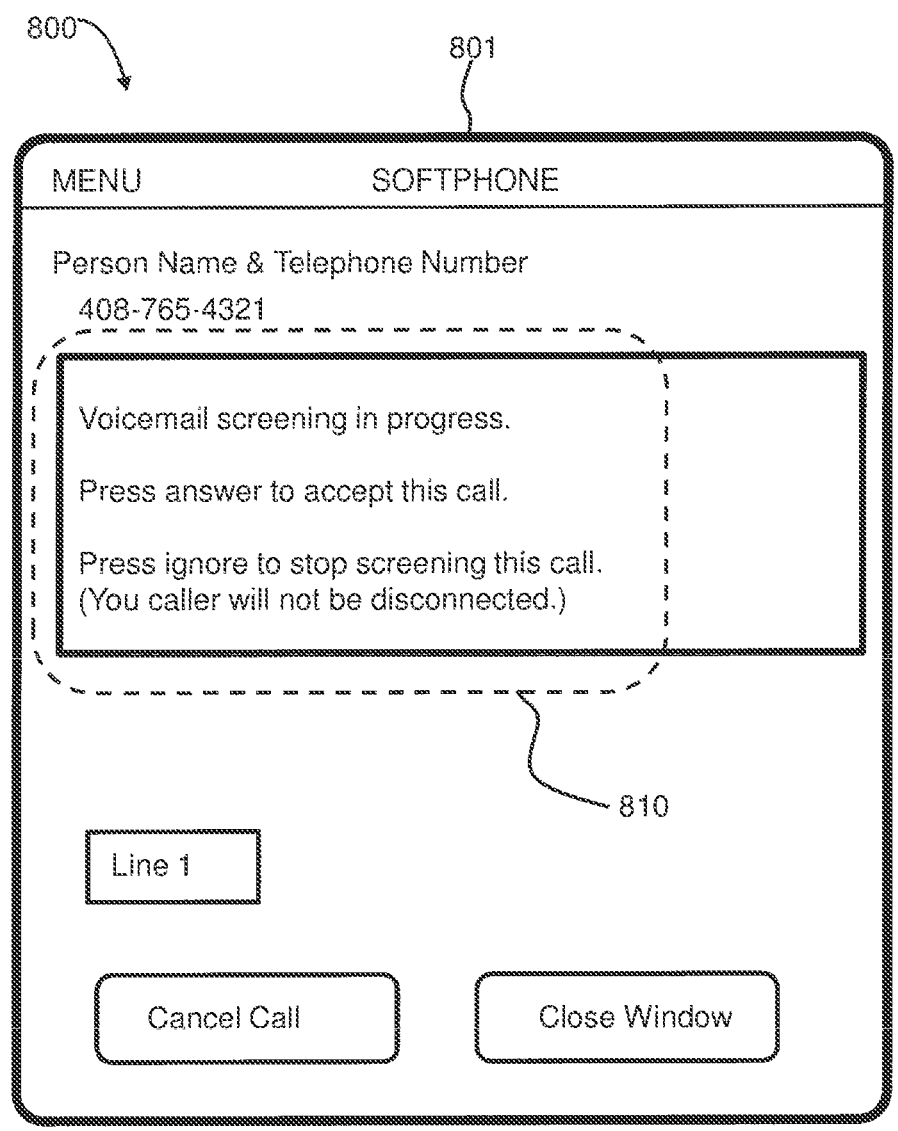
FIG. 8 is a diagram showing an example of an interface configured to screen a call into voicemail, according to at least one embodiment of the invention.

FIG. 8 is a diagram 800 showing an example of an interface configured to screen a call into voicemail, according to at least one embodiment of the invention. A callee device can generate interface 801 to facilitate listening to voicemail in real-time as it is being recorded. While the callee need not be connected to the caller, audio from the caller is perceptible by the callee but audio from the callee is not perceptible to the caller. While monitoring the voicemail, the callee can interrupt the voicemail and connect with the caller. Portion 810 of interface 801 presents the status of screening to a callee while the voicemail is being recorded so that the callee can accept the call, ignore the call to continue voice message recording, or bypass current call screening.

Figure 9A:
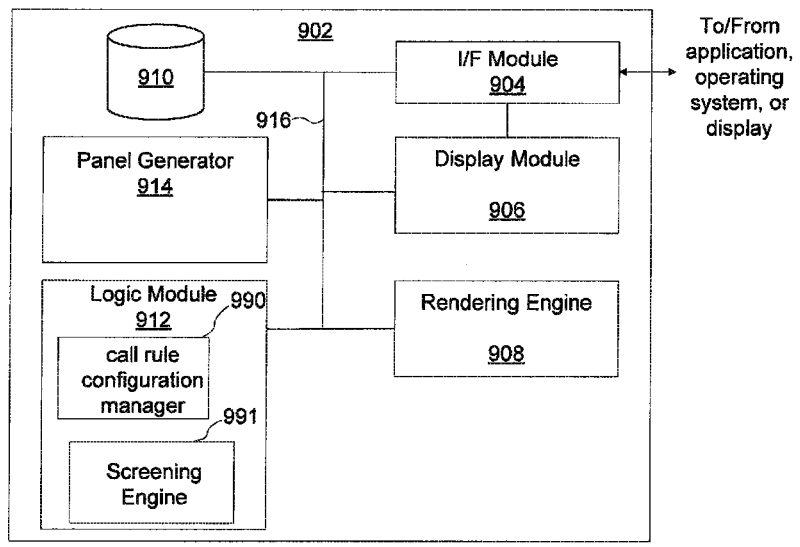
FIG. 9A illustrates an example of an application for active call filtering, screening and dispatching, according to various embodiments of the invention.

FIG. 9A illustrates an example of an application for active call filtering, screening, and dispatching, according to various embodiments of the invention. In at least one embodiment, active call filtering, screening, and dispatching can be implemented in a panel, such as a single panel, in one or more portions thereof, or in separate panels. Here, application 902 includes interface ("I/F") module 904, display module 906, rendering engine 908, repository 910, logic module 912, panel generator 914, and data bus 916. In some examples, the number and type of elements shown and described may be varied and are not limited to the descriptions provided. In some examples, the above-described elements can be implemented as part, component, or module of application 902. As an example, application 902 can be implemented to include commands for active call filtering, screening, and dispatching. Logic module 912 can be implemented as software, hardware, circuitry, or a combination thereof to implement control logic for the described techniques for panel presentation.

Figure 11:
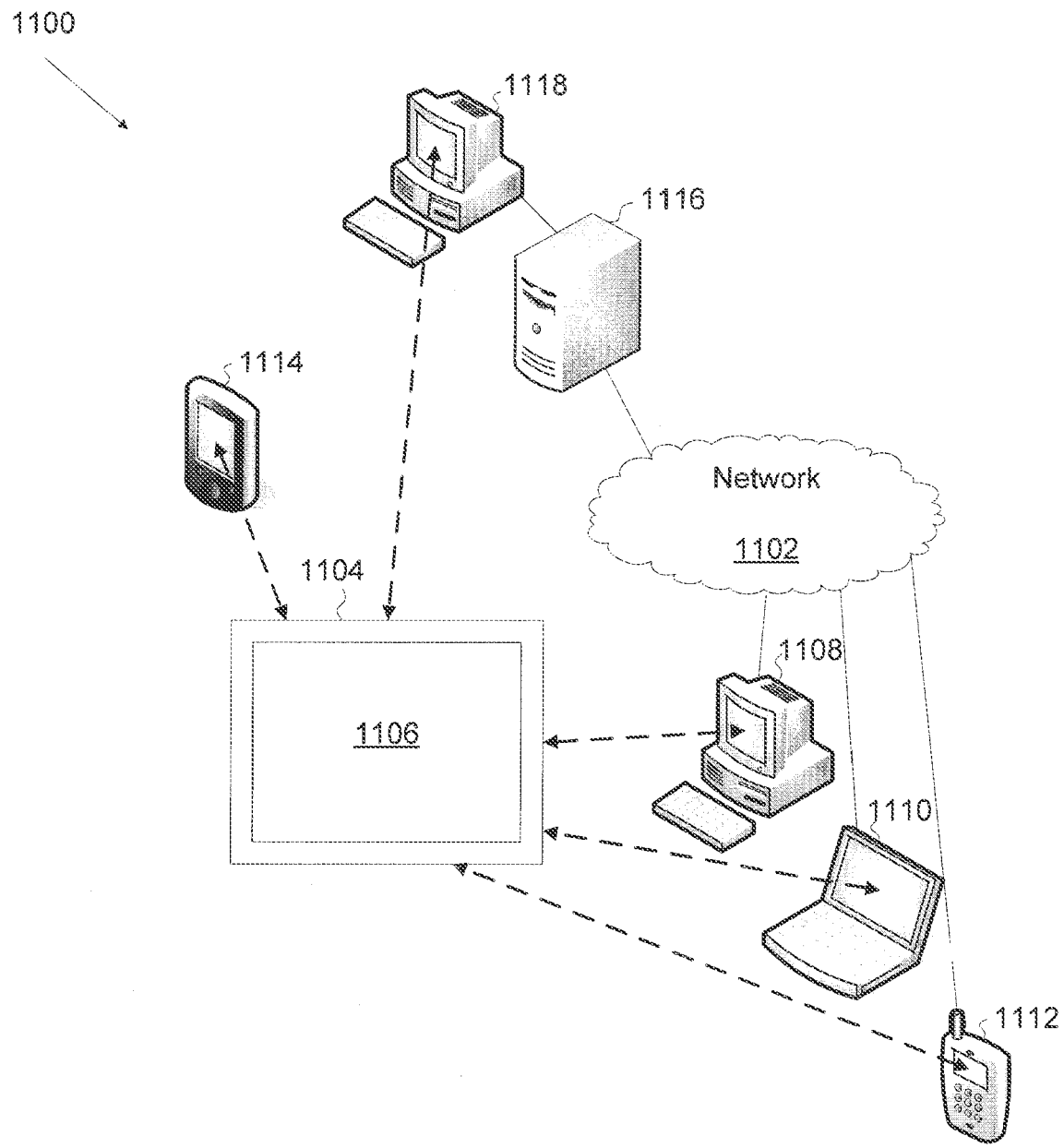
FIG. 11 illustrates an example of an interface for active call filtering, screening and dispatching, according to various embodiment of the invention.

In some examples, logic module 912 can be configured to control panel generator 914 to generate interfaces for implementing a call messaging system. Rendering engine 908 can be configured to operate as a layout engine for web pages, for example, to manipulate both content (e.g., as expressed in or including HTML, XML, image files, etc.) and formatting information (e.g., as expressed in or including CSS, XSL, etc.) for rendering the data or information as one or more panels on interface 1106 (FIG. 11). Interface module 904 can exchange panel presentation data, including content data, image data, audio data, as well as other data, between application 902 and another application (e.g., a host, client, web services-based, distributed (i.e., enterprise), application programming interface ("API"), operating system, program, procedure, or others) that can use data and information generated from panel generator 914 to render presented panels (or windows) on a display screen. In other examples, the above-described techniques and elements can be varied in design, implementation, and function and are not limited to the descriptions provided. In one embodiment, logic module 912 can include a call rule configuration manager 990 that is configured to include structure and/or functionality similar to one or more previously-described call rule configuration managers, one of which is exemplified in FIG. 1. In one embodiment, logic module 912 can include a screening engine 991 that is configured to include structure and/or functionality similar to one or more previously-described screening engines, according to various embodiments.

Figure 9B:
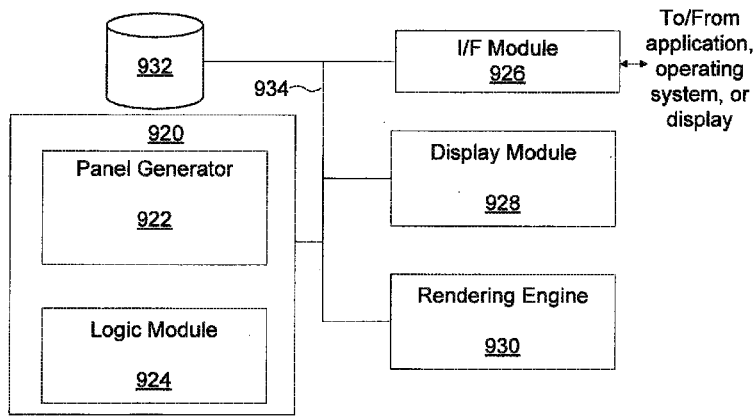
FIG. 9B illustrates an alternative example of an application for implementing active call filtering, screening and dispatching, according to one embodiment of the invention.

FIG. 9B illustrates an alternative example of an application for implementing active call filtering, screening and dispatching, according to one embodiment of the invention. Here, application 920 includes panel generator 922 and logic module 924, the latter capable of having equivalent functionality as 912 of FIG. 9A. Further, application 920 is shown in data communication with interface ("I/F") module 926, display module 928, rendering engine 930, and repository 932. Data bus 934 can be configured to send or receive data among application 920, I/F module 926, display module 928, rendering engine 930, and repository 932. In other examples, more, fewer or different elements can be used and implemented without limitation to the examples provided above.

In some examples, logic module 924 and panel generator 922 can be implemented as part of application 920, which can be implemented separately from other functional components or modules, such as interface module 926, display module 928, rendering module 930, and repository 932. Data bus 934 can be implemented to communicate data over a given port between application 920 and interface module 926, display module 928, rendering module 930, and repository 932. In some instances, application 920 can be implemented as a standalone application or as a component (i.e., module) of another application. Data or information (including, for example, data for describing one or more attributes of a call, responses communicated in situ during an active call, and the like) associated with a panel can be stored in repository 932, which can be implemented using a database, data store, data warehouse, or any other type of data repository or structure. In other examples, more, fewer, or different modules can be used to implement the described techniques for panel presentation and are not limited to those provided.

Figure 10:
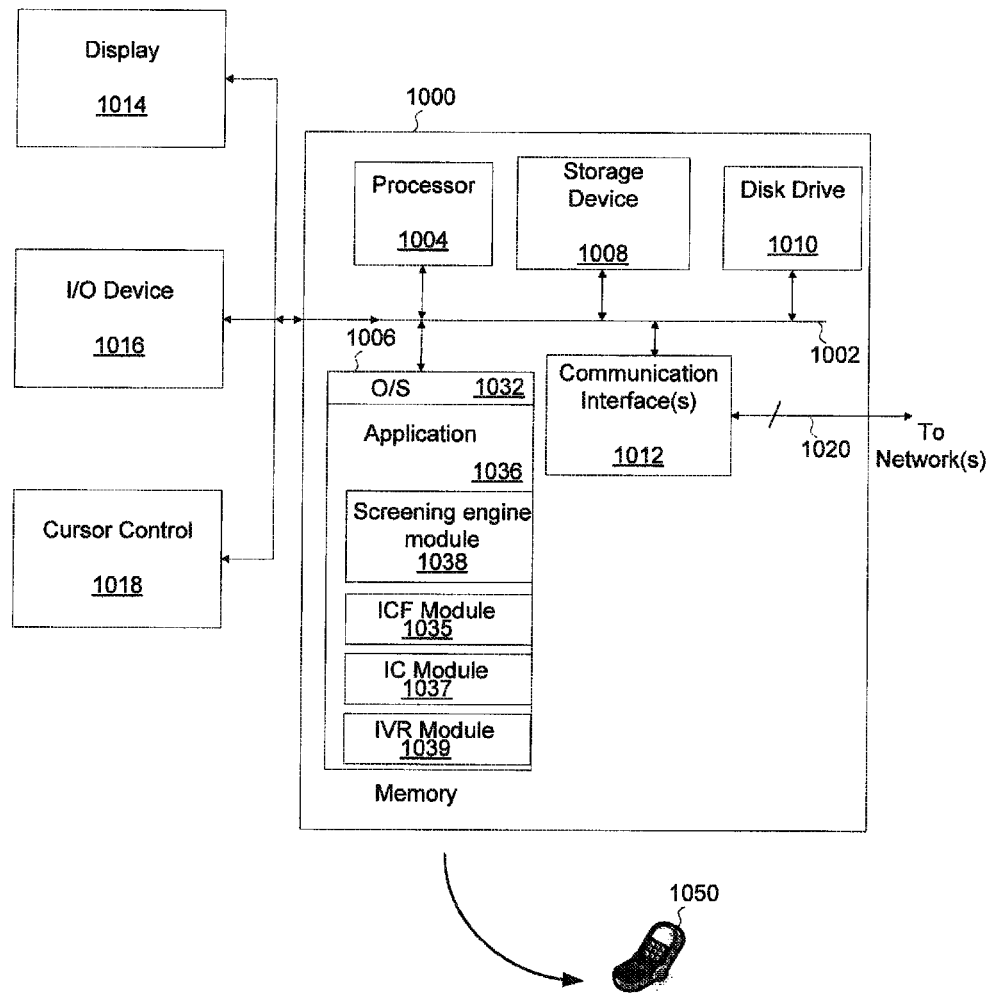
FIG. 10 illustrates an exemplary computing system or device suitable to implement active call filtering, screening and dispatching, according to at least one embodiment of the invention.

FIG. 10 illustrates an exemplary computing system or device suitable to implement active call filtering, screening and dispatching, according to at least one embodiment of the invention. In some examples, computing device 1000 can be used to implement computer programs, applications, methods, processes, or other software to perform the above-described techniques and to realize the structures described herein. Computing device 1000 includes a bus 1002 or other communication mechanism for communicating information, which interconnects subsystems and devices, such as processor 1004, system memory ("memory") 1006, storage device 1008 (e.g., ROM), disk drive 1010 (e.g., magnetic or optical), communication interface(s) 1012 (e.g., modem or Ethernet card, or any interface that formats data for communication via particular technologies and communication protocols, such as communicating via IP networks, digital cellular networks, and the like), display 1014 (e.g., CRT or LCD), input device 1016 (e.g., keyboard), and pointer cursor control 1018 (e.g., mouse or trackball). In one embodiment, pointer cursor control 1018 invokes one or more specialized commands that, at least in part, manages active call filtering, screening and dispatching. Pointer cursor control 1018 can interact via a pointer cursor with a call messaging system configured to implement active call filtering, screening and dispatching.

According to some examples, computing device 1000 can perform specific operations in which processor 1004 executes one or more sequences of one or more instructions stored in system memory 1006. Such instructions can be read into system memory 1006 from another computer readable medium, such as static storage device 1008 or disk drive 1010. In some examples, hard-wired circuitry can be used in place of or in combination with software instructions for implementation. In the example shown, system memory 1006 includes modules of executable instructions for implementing an operation system ("O/S") 1032, an application 1036, and a screening module 1038, as well as in situ call forwarding ("ICF") module 1035 in situ communication ("IC") module 1037, and in situ voicemail screening ("IVR") module 1039.

The term "computer readable medium" refers, at least in one embodiment, to any medium that participates in providing instructions to processor 1004 for execution. Such a medium can take many forms, including but not limited to, non-volatile media, volatile media, and transmission media. Non-volatile media includes, for example, optical or magnetic disks, such as disk drive 1010. Volatile media includes dynamic memory, such as system memory 1006. Transmission media includes coaxial cables, copper wire, and fiber optics, including wires that comprise bus 1002. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some examples, execution of the sequences of instructions can be performed by a single computer system 1000. According to some examples, two or more computing systems or devices 1000 coupled by communication link 1020 (e.g., LAN, PSTN, or wireless network) can perform the sequence of instructions in coordination with one another. Computer system or device 1000 can transmit and receive messages, data, and instructions, including program code (i.e., application code) through communication link 1020 and communication interface 1012. Received program code can be executed by processor 1004 as it is received, and/or stored in disk drive 1010, or other non-volatile storage for later execution. In one embodiment, computing system or device 1000 can be implemented as a hand-held device, such as a mobile phone 1050 or a handheld personal computer, or combination mobile phone/computer. But in other embodiments computing system or device 1000 can be implemented as a personal computer (i.e., a desk top computer) or any other computing device.

FIG. 11 illustrates an example of an interface for active call filtering, screening and dispatching, according to various embodiment of the invention. Here, computing system 1100 includes network 1102, display environment 1104, interface 1106, which can be presented on devices such as computer 1108, notebook computer ("notebook" or "laptop") 1110, smart phone 1112, personal digital assistant ("PDA") 1114, server 1116, and administrator computer 1118. In other examples, the number and type of devices can be varied and are not limited to those shown and described.

In some examples, one or more panels for active call filtering, screening, and dispatching can be presented on interface 1106, which can be an interface for an application, or as a web browsing program, Internet content portal, client or desktop application for any purpose. Panels can be used to provide additional or supplemental information that can be contextually relevant to another panel presented in interface 1106. Computer 1108, notebook computer ("notebook" or "laptop") 1110, smart phone 1112, personal digital assistant ("PDA") 1114, server 1116, and administrator computer 1118 can provide content data for rendering content as well as other data, which can be implemented to generate, for example, prompts in interface 1106. In some cases, an operating system installed on computer 1108 can communicate (i.e., via an API) content data and/or other related data to another application installed on computer 1108 to render (i.e., interpreting data and information to draw or display the content in an interface) one or more panels presented in interface 1106. In some examples, different types of panels can be rendered in interface 1106. In one embodiment, interface 1106 can include any number and/or any type of display environments, such as CRT and LCD displays. Note that the above-described system and elements can be varied and are not limited to the descriptions or examples provided.

In at least some of the embodiments of the invention, the structures and/or functions of any of the above-described interfaces and panels can be implemented in software, hardware, firmware, circuitry, or a combination thereof. Note that the structures and constituent elements shown in FIGS. 9A to 11, as well as their functionality, can be aggregated with one or more other structures or elements. Alternatively, the elements and their functionality can be subdivided into constituent sub-elements, if any. As software, the above-described techniques can be implemented using various types of programming or formatting languages, frameworks, syntax, applications, protocols, objects, or techniques, including C, Objective C, C++, C#, Flex™, Fireworks®, Java™, Javascript™, AJAX, COBOL, Fortran, ADA, XML, HTML, DHTML, XHTML, HTTP, XMPP, and others. These can be varied and are not limited to the examples or descriptions provided.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the present invention to any embodiment; rather features and aspects of one embodiment can readily be interchanged with other embodiments.

Thus, the foregoing descriptions of specific embodiments of the invention are presented for purposes of illustration and description. They are not intended to be exhaustive or to limit the invention to the precise forms disclosed; many alternatives, modifications, equivalents, and variations are possible in view of the above teachings. For the purpose of clarity, technical material that is known in the technical fields related to the embodiments has not been described in detail to avoid unnecessarily obscuring the description. Thus, the various embodiments can be modified within the scope and equivalents of the appended claims. Further, the embodiments were chosen and described in order to best explain the principles of the invention and its practical applications; they thereby enable others skilled in the art to best utilize the invention and various embodiments with various modifications as are suited to the particular use contemplated. Notably, not every benefit described herein need be realized by each embodiment of the present invention; rather any specific embodiment can provide one or more of the advantages discussed above. In the claims, elements and/or operations do not imply any particular order of operation, unless explicitly stated in the claims. It is intended that the following claims and their equivalents define the scope of the invention.

What is claimed is:

1. A method comprising:
    receiving an incoming call from a device of a caller;
    determining whether a bypass condition exists for the incoming call; and
    in response to determining that the bypass condition exists, causing the incoming call to be connected to a device of a callee without performing a call screening action of a call screening rule that, based at least in part on one or more conditions of the call screening rule, applies to the incoming call;
    wherein the method is performed by one or more computing devices.

2. The method of claim 1, wherein the one or more screening actions include presenting one or more prompts at the caller's device; and wherein the method further comprises causing the incoming call to be connected to the callee's device without presenting the one or more prompts at the caller's device.

3. The method of claim 1, wherein the one or more actions include routing the incoming call to voicemail of the callee; and wherein the method further comprises causing the incoming call to be connected to the callee's device without routing the incoming call to the callee's voicemail.

4. The method of claim 1, wherein determining whether a bypass condition exists comprises determining a priority of the incoming call and determining whether a bypass condition exists based at least in part on the priority.

5. The method of claim 1, wherein determining whether a bypass condition exists comprises determining that a bypass condition does exist based at least in part on determining that a previous call from the callee's device to the caller's device was disconnected.

6. The method of claim 1, wherein determining whether a bypass condition exists comprises determining that a bypass condition does exist based at least in part on determining that a previous call from the callee's device to the caller's device could not be connected.

7. The method of claim 1, wherein determining whether a bypass condition exists comprises determining that a bypass condition does exist based at least in part on a determined identity of the caller's device.

8. The method of claim 1, wherein determining whether a bypass condition exists includes determining that a bypass condition does exist based at least in part on a determined time of the incoming call.

9. The method of claim 1, wherein the caller's device is a device selected from the group consisting of an analog telephone, an Internet Protocol (IP) phone, a computing device executing a softphone application, and a hand-held cellular telephone; and wherein the callee's device is a device selected from the group consisting of an analog telephone, an Internet Protocol (IP) phone, a computing device executing a softphone application, and a hand-held cellular telephone.

10. The method of claim 1, further comprising:
    prior to determining whether a bypass condition exists for the incoming call, determining whether to filter the incoming call.

11. The method of claim 1, further comprising:
    prior to determining whether a bypass condition exists for the incoming call, determining an identifier pertaining to the caller, and determining whether to block the incoming call based at least in part on the identifier pertaining to the caller.

12. The method of claim 1, wherein the call screening rule is associated with an identifier of the callee.

13. The method of claim 1, wherein the call screening rule is associated with an identifier of the callee's device.

14. A method comprising:
    receiving an incoming call from a device of a caller;
    determining whether to filter the incoming call;
    after determining not to filter the incoming call, determining whether a bypass condition exists for the incoming call; and
    in response to determining that the bypass condition exists, causing the incoming call to be connected to a device of a callee without performing a call screening action of a call screening rule that, based at least in part on one or more conditions of the call screening rule, applies to the incoming call;
    wherein the method is performed by one or more computing devices.

15. The method of claim 14, further comprising determining whether to filter the incoming call based at least in part on one or more call filtering rules associated with an identifier of the callee.

16. The method of claim 14, further comprising determining whether to filter the incoming call based at least in part on one or more call filtering rules associated with an identifier of the callee's device.

17. A method comprising:
    receiving an incoming call from a device of a caller;
    determining an identifier pertaining to the caller;
    determining whether to block the incoming call based at least in part on the identifier pertaining to the caller;

after determining not to block the incoming call, determining whether a bypass condition exists for the incoming call; and in response to determining that the bypass condition exists, causing the incoming call to be connected to a device of a callee without performing a call screening action of a call screening rule that, based at least in part on one or more conditions of the call screening rule, applies to the incoming call;

wherein the method is performed by one or more computing devices.

18. The method of claim 17, wherein the identifier pertaining to the caller is an identifier of the caller's device.

19. The method of claim 17, further comprising determining whether to block the incoming call based at least in part on the identifier pertaining to the caller and one or more call routing rules associated with an identifier of the callee.

* * * * *